(12) United States Patent
Marathe et al.

(10) Patent No.: US 9,892,572 B2
(45) Date of Patent: *Feb. 13, 2018

(54) CROWD SOURCED OPTIMIZATION OF VEHICLE PERFORMANCE BASED ON CLOUD BASED DATA

(71) Applicant: AT&T Intellectual Property I, L.P., Atlanta, GA (US)

(72) Inventors: Nikhil S. Marathe, Roselle, IL (US); Christopher Baldwin, Algonquin, IL (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/336,149

(22) Filed: Oct. 27, 2016

(65) Prior Publication Data

US 2017/0046885 A1 Feb. 16, 2017

Related U.S. Application Data

(63) Continuation of application No. 14/957,301, filed on Dec. 2, 2015, now Pat. No. 9,508,202, which is a
(Continued)

(51) Int. Cl.
*G08G 1/09* (2006.01)
*G07C 5/08* (2006.01)
(Continued)

(52) U.S. Cl.
CPC .............. *G07C 5/0808* (2013.01); *G07C 5/02* (2013.01); *G07C 5/08* (2013.01); *G08G 1/0967* (2013.01);
(Continued)

(58) Field of Classification Search
CPC .......... G06Q 30/00; G06F 7/00; G06F 17/30; G06F 15/16; G06F 3/048
(Continued)

(56) References Cited

U.S. PATENT DOCUMENTS 6,362,730 B2 3/2002 Razavi et al.
6,388,579 B1 5/2002 Adcox et al.
(Continued)

OTHER PUBLICATIONS

Abid, et al., "V-Cloud: Vehicular Cyber-Physical Systems and Cloud Computing". Copyright © 2011 ACM ISBN 978-1-4503-0913-4/11110. Retrieved on Aug. 6, 2013, 5 pages.
(Continued)

*Primary Examiner* — Toan N Pham
(74) *Attorney, Agent, or Firm* — Amin, Turocy & Watson, LLP

(57) ABSTRACT

Tracking intrinsic and extrinsic vehicle parameters for optimizing vehicle performance is presented herein. A method can include consolidating sets of data associated with a vehicle to generate a model; generating, using the model, recommendation data representing a recommendation associated with an operation of the vehicle; and in response to receiving a request from a device of the vehicle corresponding to the operation of the vehicle, sending, based on the request, a message comprising the recommendation directed to the device of the vehicle. In an example, the method can further include determining, based on crowdsourced data representing the characteristic of the element of the vehicle, whether the characteristic satisfies a defined condition with respect to the operation of the vehicle.

20 Claims, 14 Drawing Sheets

Related U.S. Application Data continuation of application No. 14/060,085, filed on Oct. 22, 2013, now Pat. No. 9,240,082.

(51) Int. Cl.
    *G08G 1/0967*     (2006.01)
    *G07C 5/02*     (2006.01)
    *H04L 29/08*     (2006.01)

(52) U.S. Cl.
    CPC . *G08G 1/096716* (2013.01); *G08G 1/096741* (2013.01); *H04L 67/10* (2013.01); *H04L 67/12* (2013.01); *G08G 1/096775* (2013.01)

(58) Field of Classification Search
    USPC ............ 340/905, 601, 438, 531, 539.1, 439; 705/14.64, 14.58; 707/706, 802, 707/E17.108; 701/31.4, 29, 33, 14.4
    See application file for complete search history.

(56) References Cited

U.S. PATENT DOCUMENTS

| | | | |
|---|---|---|---|
| 6,850,823 | B2 | 2/2005 | Eun et al. |
| 6,941,202 | B2 | 9/2005 | Wilson et al. |
| 7,155,321 | B2 | 12/2006 | Bromley et al. |
| 7,532,963 | B1 | 5/2009 | Lowrey et al. |
| 7,778,752 | B1 | 8/2010 | Hunt et al. |
| 8,195,428 | B2 | 6/2012 | Kamdar et al. |
| 8,374,745 | B2 | 2/2013 | Zhang et al. |
| 9,240,082 | B2 | 1/2016 | Marathe et al. |
| 2004/0210360 | A1 | 10/2004 | Dietz et al. |
| 2008/0319665 | A1 | 12/2008 | Berkobin et al. |
| 2011/0191186 | A1 | 8/2011 | Levy et al. |
| 2012/0054036 | A1 | 3/2012 | Nam et al. |
| 2012/0296512 | A1 | 11/2012 | Lee et al. |
| 2013/0054050 | A1 | 2/2013 | Filev et al. |
| 2013/0231841 | A1 | 9/2013 | Rothschild |
| 2014/0277902 | A1 | 9/2014 | Koch |

OTHER PUBLICATIONS

Franklin, et al., "CrowdDB: Answering Queries with Crowdsourcing". Copyright 2011 ACM 978-1-4503-0661—Apr. 11, 2006. Retrieved on Aug. 6, 2013, 12 pages.

"Connected Vehicle Insights". Fourth Generation Wireless—Vehicle and Highway Gateways to the Cloud. Technology Scan and Assessment Final Report—Dec. 2011, FHWA-JPO-12-024, U.S. Department of Transportation, Research and Innovative Technology Administration. www.its.dot.gov/index.htm.Retrieved on Aug. 6, 2013, 22 pages.

Office Action dated May 4, 2015 for U.S. Appl. No. 14/060,085, 20 pages.

Office Action dated Mar. 25, 2016 for U.S. Appl. No. 14/957,301, 18 pages.

CROWD SOURCED OPTIMIZATION OF VEHICLE PERFORMANCE BASED ON CLOUD BASED DATA

PRIORITY CLAIM

This patent application is a continuation of, and claims priority to each of, U.S. patent application Ser. No. 14/957,301 (now U.S. Pat. No. 9,508,202), filed on Dec. 2, 2015, and entitled "CROWD SOURCED OPTIMIZATION OF VEHICLE PERFORMANCE BASED ON CLOUD BASED DATA", which claims priority to U.S. patent application Ser. No. 14/060,085 (now U.S. Pat. No. 9,240,082), filed on Oct. 22, 2013, and entitled "CROWD SOURCED OPTIMIZATION OF VEHICLE PERFORMANCE BASED ON CLOUD BASED DATA." The entireties of the aforementioned applications are hereby incorporated by reference herein.

BACKGROUND

People desire optimal vehicle performance, for example, associated with driving experience, fuel consumption, longevity of their vehicles, etc. However, conventional vehicle technologies have had some drawbacks with respect to increasing vehicle performance.

BRIEF DESCRIPTION OF THE DRAWINGS

Non-limiting embodiments of the subject disclosure are described with reference to the following figures, wherein like reference numerals refer to like parts throughout the various views unless otherwise specified.

DETAILED DESCRIPTION

Figure 1:
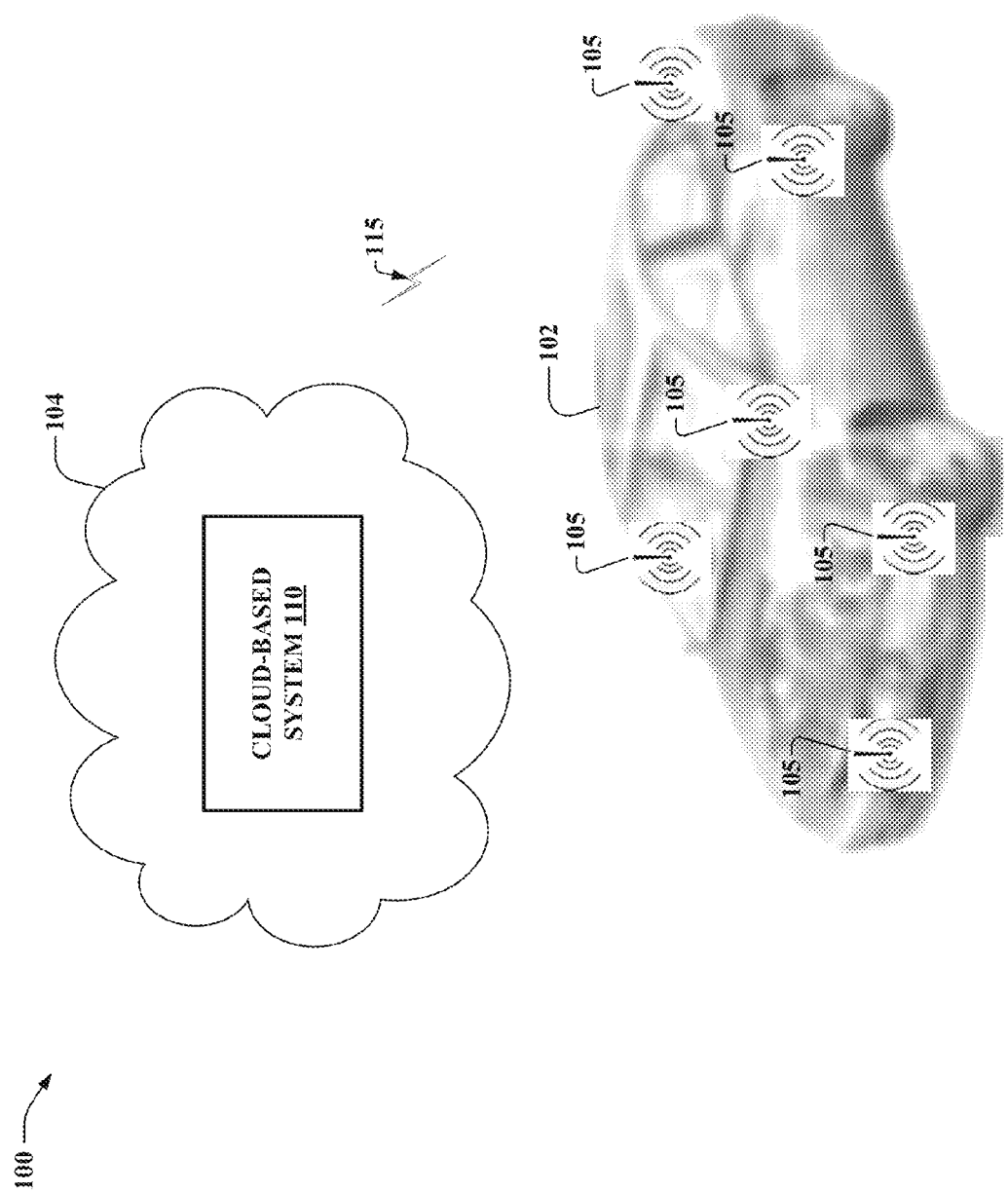
FIG. 1 illustrates a block diagram of a vehicle environment, in accordance with various embodiments.

Aspects of the subject disclosure will now be described more fully hereinafter with reference to the accompanying drawings in which example embodiments are shown. In the following description, for purposes of explanation, numerous specific details are set forth in order to provide a thorough understanding of the various embodiments. However, the subject disclosure may be embodied in many different forms and should not be construed as limited to the example embodiments set forth herein.

Automobile performance varies according to parameters that are intrinsic to a car, vehicle, etc., e.g., based on tire wear, engine conditions, etc. Further, automobile performance varies according to extrinsic parameters of the car, e.g., based on traffic, temperature, weather conditions, driving behavior, fuel type, etc. Various embodiments disclosed herein can optimize vehicle performance, e.g. driving experience, fuel consumption, element endurance, etc. by tracking such parameters, e.g., utilizing sensors, components, etc. of a wirelessly connected vehicle, and utilizing a crowdsourced, e.g., an online, distributed problem-solving platform, etc. to send recommendation(s), configuration data, etc. to the wirelessly connected vehicle for optimizing vehicle performance.

For example, a method can consolidate, by a system, e.g., a cloud-based Internet platform, etc. sets of data, e.g., including sensor data, traffic data, weather data, driving behavior information, crowdsourced data, fuel data, etc. associated with a characteristic of an element of a vehicle to generate, create, derive, etc. a model. In this regard, the system can associate, using the model, the characteristic of the element, e.g., a determined percentage of remaining tire tread, etc. with a recommendation associated with an operation of the vehicle, e.g., to change the tire, to drive at a particular speed, to drive a different route, etc.

In one embodiment, the method can receive, from devices of a group of vehicles including the vehicle, sets of sensor data representing the characteristic of the element of the vehicle, and generate the model using the sets of sensor data, e.g., the group of vehicles associated with a similar make, model, and year of vehicle. For example, the method can associate, using the model, the characteristic of the element of the group of vehicles with the recommendation. In an embodiment, the sensor data can be wirelessly received from the vehicle, the group of vehicles, etc., e.g., during vehicle operation In another embodiment, the method can receive information representing driving condition(s), e.g., current weather, traffic, temperature, humidity, etc. with respect to the operation of the vehicle. Further, the method can generate the model using the information representing the driving condition(s), e.g., by associating the characteristic of the element of the vehicle and the driving condition(s) with the recommendation.

In yet another embodiment, the method can receive, from a group of network devices of a communication network, a wide area network, etc., for example, via the Internet, crowdsourced data representing the characteristic of the element of the vehicle. For example, the crowdsourced data can be derived by receiving, via the Internet, human-oriented feedback from a "crowd" of devices, computing devices, etc. communicatively coupled to the cloud-based Internet platform. Such human-oriented feedback can be received in response to the method soliciting, requesting, initiating, etc. response(s), recommendation(s), etc. from the crowd of devices regarding the element of the vehicle, e.g., with respect to the information representing the driving condition(s). For example, the method can solicit recommendations from the crowd of devices as to whether a tire of the vehicle should be changed given determined characteristics of the tire and the driving condition(s).

In an embodiment, the method can generate the model, generate recommendation data, e.g., generate the recommendation associated with the operation of the vehicle, etc. using the crowdsourced data, e.g., by determining a consensus, an average value, etc. of the responses representing recommendations associated with the characteristic of the vehicle, and/or by selecting crowdsourced data associated with a predetermined bias level, e.g., assigned to contributors of the crowdsourced data associated with a high level of expertise, experience, etc. with respect to the characteristic of the vehicle.

In another embodiment, the method can receive a query from the crowd of devices requesting further information from the vehicle, a device of the vehicle, etc. corresponding to other characteristic(s) of the vehicle. In this regard, the crowdbased feedback can be a result of multiple communications between the device of the vehicle and the crowd of devices. For example, a portion of the crowd of devices can send a request to the vehicle, the device of the vehicle, etc. to obtain further information about a characteristic of the vehicle in response to receiving a solicitation of a recommendation from the device of the vehicle. Further, the portion of the crowd of devices can update, modify, etc. the recommendation based on the further information received from the device of the vehicle, and communicate a revised recommendation to the device of the vehicle.

In one embodiment, the method can determine, based on the model and sensor data wirelessly received from the vehicle, e.g., referencing tire pressure, tire tread, gas level, etc. whether the characteristic satisfies a defined condition with respect to the operation of the vehicle, e.g., whether less than 10% of the tire tread remains. In another embodiment, the method can determine, based on the model and information representing the driving condition(s), whether the characteristic satisfies the defined condition, e.g., whether less than 10% of the tire tread remains with respect to rainy conditions. In yet another embodiment, the method can determine, based on the crowdsourced data, whether the characteristic satisfies the defined condition, e.g., whether the crowdsourced data represents sending a recommendation to a device of the vehicle when less than 10% of the tire tread remains under wet driving conditions.

In an embodiment, in response to the characteristic being determined to satisfy the defined condition, the method can send a message including the recommendation, e.g., to change a tire, etc. directed to the device of the vehicle in response to receiving a request from a device of the vehicle, e.g., received via a driver of the vehicle querying the cloud-based system, received via the driver querying the crowd of devices communicatively coupled to the cloud-based system, etc. whether a tire should be changed with respect to driving at a location under given weather conditions. In one embodiment, the method can automatically infer, anticipate, etc. the request using the model and information representing the driving condition(s), and send the message including the recommendation associated with the operation of the vehicle in response to the characteristic being determined to satisfy the defined condition.

In another embodiment, a system comprising a processor can include a model component configured to receive sets of data associated with a vehicle, e.g., sensor data received from a device of the vehicle representing a characteristic of an element of the vehicle with respect to an operation of the vehicle, sensor data received from devices of other vehicles associated with the characteristic, crowdsourced data representing the characteristic received from the crowd of devices, weather condition information corresponding to the operation of the vehicle, traffic information corresponding to the operation of the vehicle, etc. Further, the model component can be configured to generate the model based on the sets of data, e.g., by associating a recommendation regarding the operation of the vehicle with the sets of data, e.g., based on the crowdsourced data representing a consensus of responses, recommendations, etc. received from the crowd of devices regarding the characteristic of the element, e.g., in response to the model component soliciting, requesting, etc. the responses, recommendations, etc. from the crowd of devices.

Further, the system can include a recommendation component configured to generate, select, derive, etc. the recommendation in response to determining, based on the sensor data and the model, whether the characteristic satisfies a defined condition with respect to the operation of the vehicle, e.g., whether received sensor data representing the characteristic correlates with the consensus of the responses, recommendations, etc. received from the crowd of devices regarding the characteristic, e.g., based on the weather condition information, the traffic information, etc.

In one embodiment, the recommendation component can be configured to send a message including the recommendation directed to the device of the vehicle in response to receiving a request from the device of the vehicle, e.g., in response to receiving a query from a driver of the vehicle directed to the crowd of devices.

In another embodiment, the recommendation component can be configured to determine whether the message including the recommendation has been received by the device of the vehicle, e.g., based on information, an acknowledgment message, etc. received from the device of the vehicle. Further, the recommendation component can be configured to determine whether the recommendation has been implemented, e.g., based on sensor data received from the device of the vehicle, based on a confirmation message received from the device of the vehicle, e.g., from a driver of the vehicle indicating the recommendation has been implemented, etc.

Further, in response to determining, via the recommendation component, that the message has been received by the device of the vehicle, but the recommendation has not been implemented, the model component can update, modify, etc. future recommendation(s) accordingly, e.g., by associating non-implementation of the recommendation with the vehicle.

In another embodiment, the recommendation component can be configured to send the message including the recommendation directed to the device of the vehicle in response to automatically inferring, anticipating, etc. the request from the device of the vehicle using the sensor data, the model, the crowdsourced data, the weather condition information, the traffic information, etc.

In yet another embodiment, during a "safety override" configuration, the recommendation component can initiate a configuration, reconfiguration, etc. of element(s) of the vehicle in response to automatically determining, e.g., based on the sensor data, the model, the crowdsourced data, the weather condition information, the traffic information, etc. that the characteristic satisfies the defined condition, e.g., that with 10% of a tire tread remaining, a breaking distance of the vehicle in wet conditions is 40 feet instead of 20 feet. In this regard, the recommendation component can automatically configure acceleration, breaking, etc. components of the vehicle to adjust a driving position of the vehicle to be at least 40 feet from another vehicle with 10% of the tire tread remaining in wet driving conditions; and the recommendation component can automatically configure the acceleration, breaking, etc. components of the vehicle to adjust the driving position of the vehicle to be at least 20 feet from another vehicle with 10% of the tire tread remaining in dry driving conditions.

In an embodiment, the vehicle can include a user interface configured to alert the driver of the vehicle, e.g., via a display device of the vehicle, via a sound device of the vehicle, etc. of the recommendation, e.g., alerting the driver that a level of gas in a fuel tank of the vehicle is low, alerting the driver that a tire should be replaced, alerting the driver that the vehicle is automatically slowing in wet conditions, etc.

Another embodiment can include a computer-readable storage device comprising executable instructions that, in response to execution, cause a system comprising a processor to perform operations, comprising: creating a model based on sets of data associated with a vehicle; creating, using the model, a recommendation with respect to an operation of the vehicle; and in response to receiving a request from a device of the vehicle corresponding to the operation of the vehicle, sending the recommendation directed to the device of the vehicle based on the request.

In one embodiment, the operations can include receiving crowdsourced data representing a characteristic of an element of the vehicle from a group of network devices of a communication network, a wide area network, etc.; and creating the recommendation and sending the recommendation directed to the device in response to determining, based on the crowdsourced data, that the characteristic satisfies a defined condition with respect to the operation of the vehicle.

In an embodiment, the operations can include receiving sensor data representing a characteristic of an element of the vehicle from the device of the vehicle; creating the recommendation in response to determining, based on the sensor data, that the characteristic satisfies a defined condition with respect to the operation of the vehicle; and sending the recommendation directed to the device.

In yet another embodiment, the operations can include receiving, from devices of a group of vehicles comprising the vehicle, sets of sensor data associated with a characteristic of an element of the vehicle; and creating the model using the sets of sensor data.

Reference throughout this specification to "one embodiment," or "an embodiment," means that a particular feature, structure, or characteristic described in connection with the embodiment is included in at least one embodiment. Thus, the appearances of the phrase "in one embodiment," or "in an embodiment," in various places throughout this specification are not necessarily all referring to the same embodiment. Furthermore, the particular features, structures, or characteristics may be combined in any suitable manner in one or more embodiments.

Furthermore, to the extent that the terms "includes," "has," "contains," and other similar words are used in either the detailed description or the appended claims, such terms are intended to be inclusive—in a manner similar to the term "comprising" as an open transition word—without precluding any additional or other elements. Moreover, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, components can execute from various computer readable media having various data structures stored thereon. The components can communicate via local and/or remote processes such as in accordance with a signal having one or more data packets (e.g., data from one component interacting with another component in a local system, distributed system, and/or across a network, e.g., the Internet, with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Aspects of systems, apparatus, and processes explained herein can constitute machine-executable instructions embodied within a machine, e.g., embodied in a computer readable medium (or media) associated with the machine. Such instructions, when executed by the machine, can cause the machine to perform the operations described. Additionally, the systems, processes, process blocks, etc. can be embodied within hardware, such as an application specific integrated circuit (ASIC) or the like. Moreover, the order in which some or all of the process blocks appear in each process should not be deemed limiting. Rather, it should be understood by a person of ordinary skill in the art having the benefit of the instant disclosure that some of the process blocks can be executed in a variety of orders not illustrated.

Furthermore, the word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art.

The disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, magnetic storage devices, e.g., hard disk; floppy disk; magnetic strip(s); optical disk (e.g., compact disk (CD), digital video disc (DVD), Blu-ray Disc™ (BD)); smart card(s); and flash memory device(s) (e.g., card, stick, key drive); and/or a virtual device that emulates a storage device and/or any of the above computer-readable media.

Artificial intelligence based systems, e.g., utilizing explicitly and/or implicitly trained classifiers, can be employed in connection with performing inference and/or probabilistic determinations and/or statistical-based determinations as in accordance with one or more aspects of the disclosed subject matter as described herein. For example, an artificial intelligence system can be used, via model component 410 (see below), to receive sets of data, e.g., sensor data, crowd-sourced data, driving condition information, weather information, etc. associated with an operation of a vehicle, and generate a model, e.g., utilizing data store 420 (see below), to correlate, using the sets of data, an element of the vehicle with recommendation(s) regarding the operation of the vehicle. Further, the artificial intelligence system can be used, via recommendation component 430 (see below), to automatically infer, anticipate, etc. a request from a device of the vehicle utilizing the sets of data, the model, crowd-sourced data, weather condition information, traffic information, etc., e.g., based on a determined, observed, etc. driving behavior of a driver of the vehicle.

Furthermore, based on such inference, the artificial intelligence system can derive a recommendation in response to determining, based on the sensor data and the model, that a characteristic of an element of the vehicle satisfies a defined condition with respect to the operation of the vehicle. In turn, the artificial intelligence system can send a message including the recommendation directed to the device of the vehicle.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

Aspects, features, and/or advantages of the disclosed subject matter can be exploited in substantially any wireless telecommunication or radio technology, e.g., Institute of Electrical and Electronics Engineers (IEEE) 802.11x (Wi-Fi™); Bluetooth™, Worldwide Interoperability for Microwave Access (WiMAX™); Enhanced General Packet Radio Service (Enhanced GPRS); Third Generation Partnership Project (3GPP) Long Term Evolution (LTE™); Third Generation Partnership Project 2 (3GPP2); Ultra Mobile Broadband (UMB); 3GPP Universal Mobile Telecommunication System (UMTS); High Speed Packet Access (HSPA); High Speed Downlink Packet Access (HSDPA); High Speed Uplink Packet Access (HSUPA); LTE™ Advanced (LTE-A), Global System for Mobile Communication (GSM), Near Field Communication (NFC), Wibree, Wi-Fi Direct™, etc.

Further, selections of a radio technology, or radio access technology, can include second generation (2G), third generation (3G), fourth generation (4G), etc. evolution of the radio access technology; however, such selections are not intended as a limitation of the disclosed subject matter and related aspects thereof. Further, aspects, features, and/or advantages of the disclosed subject matter can be exploited in disparate electromagnetic frequency bands. Moreover, one or more embodiments described herein can be executed in one or more network elements, such as a mobile wireless device, e.g., user equipment (UE), and/or within one or more elements of a network infrastructure, e.g., radio network controller, wireless access point (AP), etc.

Moreover, terms like "user equipment," (UE) "mobile station," "mobile subscriber station," "access terminal," "terminal", "handset," "appliance," "machine," "wireless communication device," "cellular phone," "personal digital assistant," "smartphone," "wireless device", and similar terminology refer to a wireless device, or wireless communication device, which is at least one of (1) utilized by a subscriber of a wireless service, or communication service, to receive and/or convey data associated with storage of objects within a vehicle, voice, video, sound, and/or substantially any data-stream or signaling-stream; or (2) utilized by a subscriber of a voice over internet protocol (VoIP) service that delivers voice communications over internet protocol (IP) networks such as the Internet or other packet-switched networks. Further, the foregoing terms are utilized interchangeably in the subject specification and related drawings.

A communication network, e.g., core network 104 (see below), for systems, methods, and/or apparatus disclosed herein can include any suitable mobile and/or wireline-based circuit-switched communication network including a global systems for mobile communication (GSM) network, a time division multiple access (TDMA) network, a code division multiple access (CDMA) network, such as IS-95 and subsequent iterations of CDMA technology, an integrated digital enhanced network (iDEN) network and a public switched telephone network (PSTN). Further, examples of the communication network can include any suitable data packet-switched or combination data packet/circuit-switched communication network, wired or wireless IP network such as a VoIP network, an IP data network, a universal mobile telecommunication system (UMTS) network, a general packet radio service (GPRS) network, or other communication networks that provide streaming data communication over IP and/or integrated voice and data communication over combination data packet/circuit-switched technologies.

Similarly, one of ordinary skill in the art will appreciate that a vehicle system, e.g., vehicle system 102 (see below), for systems, methods, and/or apparatus disclosed herein can include a mobile device, a mobile phone, a 4G, etc. cellular communication device, a PSTN phone, a cellular communication device, a cellular phone, a satellite communication device, a satellite phone, a VoIP phone, an IEEE 802.11x (WiFi) phone, a dual-mode cellular/WiFi phone, a combination cellular/VoIP/WiFi/Worldwide Interoperability for Microwave Access (WiMAX) phone, a portable computer, or any suitable combination thereof. Specific examples of a wireless system can include, but are not limited to, a cellular device, such as a GSM, TDMA, CDMA, IS-95 and/or iDEN phone, a cellular/WiFi device, such as a dual-mode GSM, TDMA, IS-95 and/or iDEN/VoIP phones, UMTS phones, UMTS VoIP phones, or like devices or combinations thereof. In this regard, cloud-based system 110 can receive/send information, data, sensor data, driving behavior information, queries, request(s), recommendation(s), etc. from/to the vehicle system.

To provide support for cloud-based system 110, the communication network can include a gateway routing component (not shown) that can include any suitable component that can perform centralized routing within a mobile, satellite, or similar network (but optionally need not include components that route strictly within a PSTN network), routing between communication networks, between networks of varying architecture (e.g., between PSTN, GSM, UMTS), Enterprise VoIP, the Internet, or combinations thereof), and the like. Specific examples of a gateway routing component can include, but are not limited to, a gateway mobile switching center (GMSC), a gateway general packet radio service (GPRS) support node (GGSN), a session border control (SBC) device, or like devices. Additionally, a data storage component of such system(s), device(s), etc. can include any suitable device, process, and/or combination device that can store digital and/or switched information (e.g., server, data store component, or the like).

Figure 2:
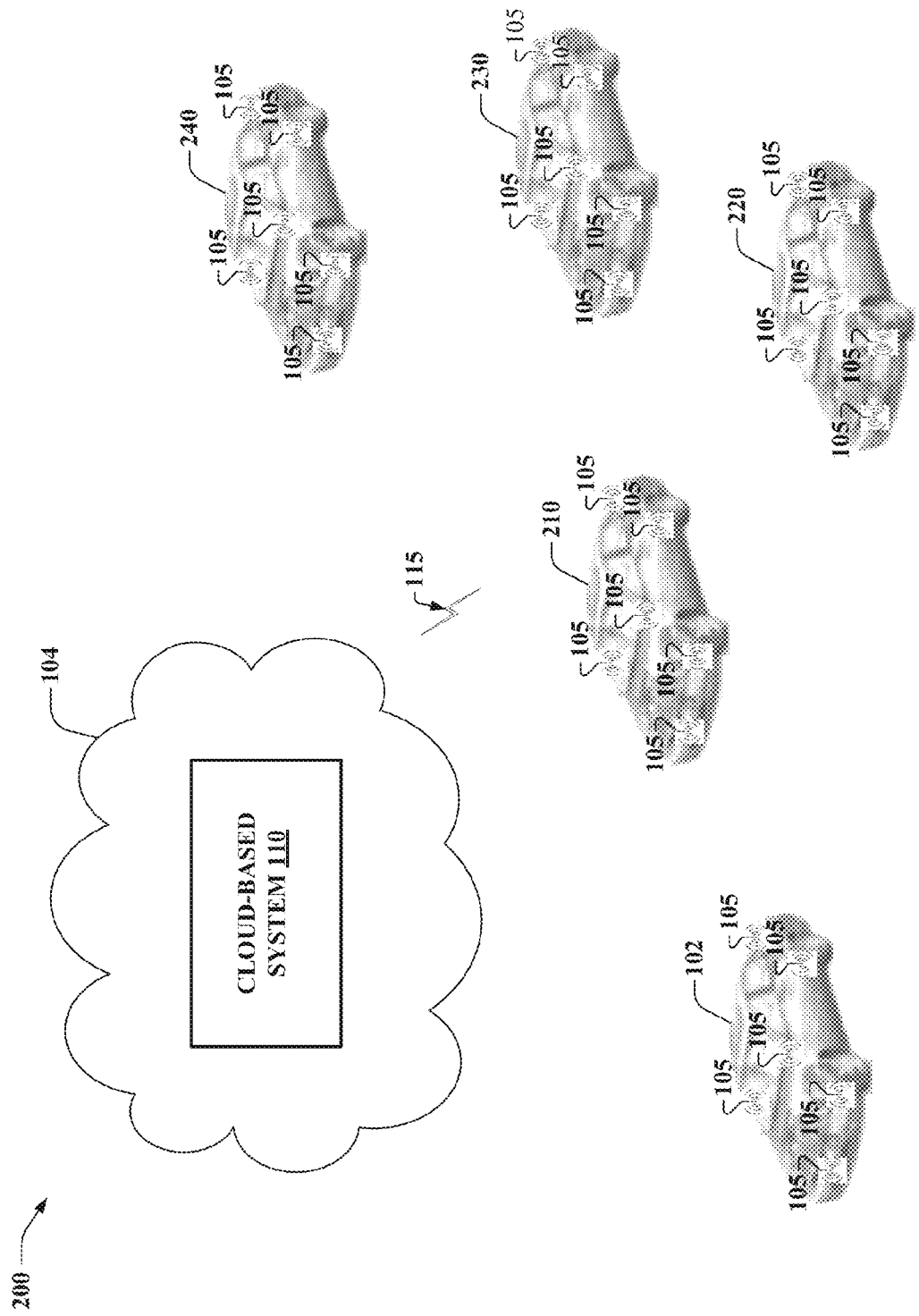
FIG. 2 illustrates a block diagram of another vehicle environment, in accordance with various embodiments.

Now referring to FIGS. 1 and 2, vehicle environments 100 and 200 for tracking intrinsic and extrinsic vehicle parameters for optimizing vehicle performance are illustrated, in accordance with various embodiments. In various aspects, cloud-based system 110 of core network 104 can be wirelessly coupled to a vehicle system, e.g., 102, 210, 220, 230, 240, etc. via wireless link 115. Wireless link 115 can be an over-the-air wireless link 115 comprising a downlink (DL) and an uplink (UL) (both not shown) that can utilize a predetermined band of radio frequency (RF) spectrum associated with, e.g., GSM, 3GPP UMTS, etc. Accordingly, the vehicle system can be a GSM and/or 3GPP UMTS based device, etc.

Core network 104 can include software and/or hardware configured to provide connectivity between cloud-based system 110 and the vehicle system. Vehicle environments 100 and/or 200 can include one or more: macro, Femto, or pico access points (APs) (not shown); base stations (BS) (not shown); landline networks (e.g., optical landline networks, electrical landline networks) (not shown) communicatively coupled between cloud-based system 110 and the vehicle system. In various embodiments, cloud-based system 110 can communicate via any number of various types of wireless technologies including, but not limited to, cellular, WiFi, WiMax, wireless local area networks (WLAN), Femto, etc. In corresponding embodiments, core network 104 can provide cellular, WiFi, WiMAX, WLAN, and/or other technologies for facilitating such communication. Further, core network 104 can include one or more of the Internet (or another communication network (e.g., IP-based network)), or a digital subscriber line (DSL)-type or broadband network facilitated by Ethernet or other technology. In this regard, cloud-based system 110 can include a cloud-based communication platform, Internet platform, wide area network, etc.

As illustrated by FIG. 2, cloud-based system 110 can be communicatively coupled to wirelessly connected vehicles, systems, etc., e.g., 210, 220, 230, 240. Further, in various embodiments, vehicle environment 100 and/or 200 can include hardware and/or software for allocating resources to the wirelessly connected vehicles, e.g., converting or enforcing protocols, establishing and/or providing levels of Quality of Service (QoS), providing applications or services via core network 104, translating signals, and/or performing other desired functions to facilitate system interoperability and communication to or from the wirelessly connected vehicles.

Core network 104 can also include data store component(s), a memory configured to store information, and/or computer-readable storage media storing computer-executable instructions enabling various operations performed via cloud-based system 110 and described herein. In this regard, core network 104 can include data store component(s), e.g., data store 420 (see below), for correlating, using a model, characteristics of elements of a vehicle with recommendations associated with operation of the vehicle. For example, data store 420 can include a data table cross-referencing a recommendation associated with the operation of the vehicle with defined characteristics of an element of the vehicle, e.g., correlating a recommendation to change a tire of the vehicle in response to determining that less than 10% of a tread of the tire remains.

Referring now to FIGS. 1-2, cloud-based system 110, e.g., a cloud-based Internet platform, etc. can track, receive, etc. sensor data from sensors 105 of vehicle system 102 via wireless link 115—such data representing various characteristics of elements, e.g., engine component(s), transmission component(s), tire(s), etc. of vehicle system 102. In another embodiment, cloud-based system 110 can track, receive, etc. sets of sensor data from sensors 105 of a group of vehicles, e.g., including 102, 210, 220, 230, and 240—such data representing a characteristic of one or more of the elements of vehicle system 102 during operation of vehicle system 102. In one aspect, the group of vehicles can include vehicles of a make, model, and year that are similar to vehicle system 102. In another aspect, the group of vehicles can include vehicles within a location, city, geographical region, etc. similar to a determined location, city, geographical region, etc. of vehicle system 102.

Figure 3:
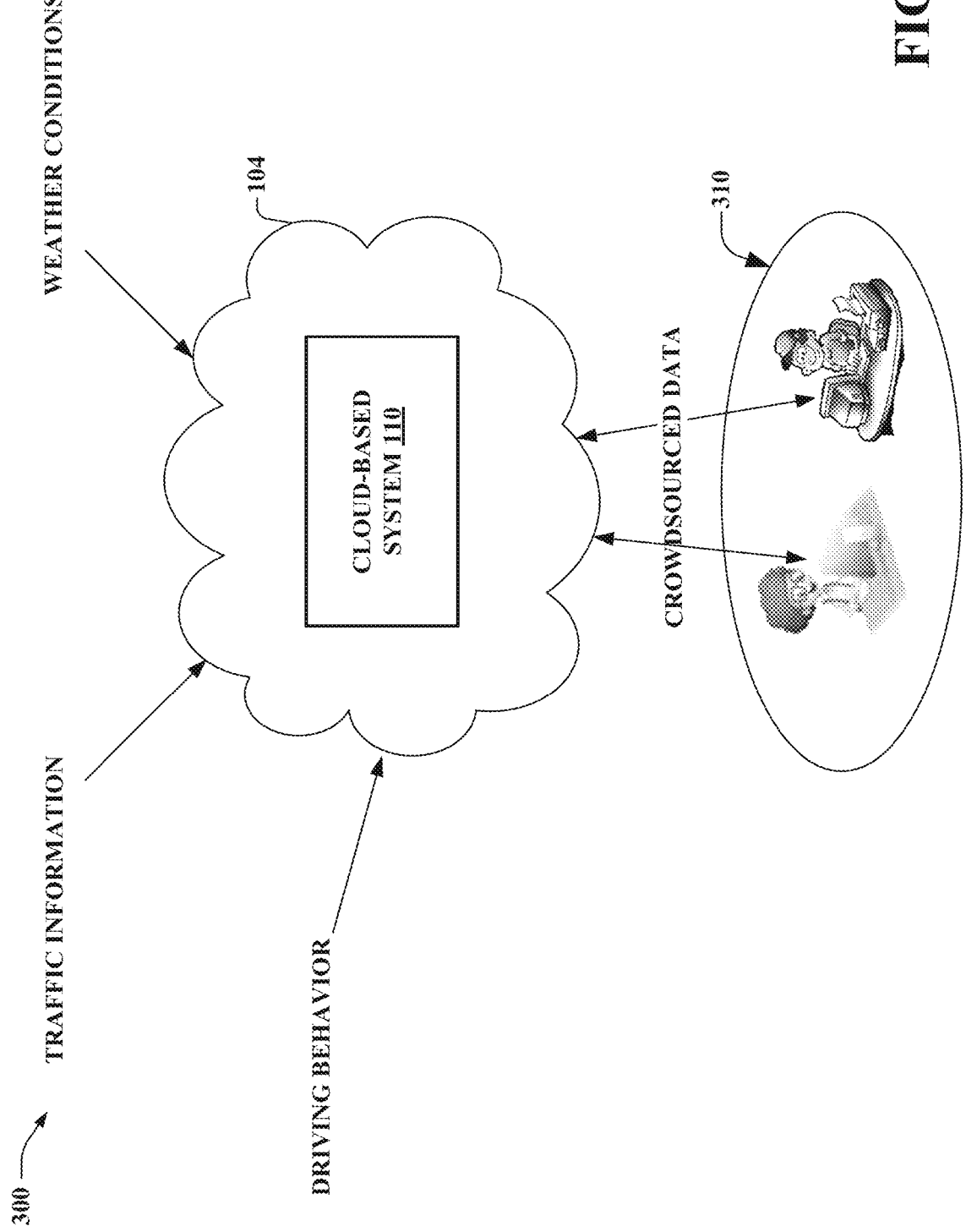
FIG. 3 illustrates a block diagram of a cloud-based computing environment, in accordance with various embodiments.

Further, in an embodiment illustrated by FIG. 3, cloud-based system 110 can track, receive, etc. traffic information, weather conditions, driving behavior, crowdsourced data, etc., e.g., associated with the operation of vehicle system 102, corresponding to a determined location of vehicle system 102, etc. For example, cloud-based system 110 can be configured to receive, from a group of network devices, e.g., crowd of devices 310, etc. of a communication network, wide area network, etc., for example, via the Internet, crowdsourced data representing a characteristic of an element of vehicle system 102, e.g., a fuel type, etc. In an aspect, the crowdsourced data can be associated with human-oriented feedback that is received, via crowd of devices 310, in response to cloud-based system 110 soliciting, requesting, initiating, etc. response(s), recommendation(s), etc. from crowd of devices 310 regarding the element of vehicle system 102, e.g., based on the traffic information, the weather conditions, the driving behavior, the fuel type, etc.

For example, cloud-based system 110 can solicit, request, etc. the response(s), recommendation(s), etc. from crowd of devices 310, e.g., via an online, distributed, cloud-based platform, e.g., in which cloud-based system 110 can publish, advertise, etc. a request for the response(s), recommendation(s), etc. to crowd of devices 310, e.g., via the Internet. For example, cloud-based system 110 can send a query to crowd of devices 310 including a request for a recommendation, e.g., for braking, optimizing gas consumption, replacing tires, etc. of vehicle system 102.

In one embodiment, cloud-based system 110 can be configured to skew, bias, etc. the response(s), recommendation(s), etc. received from crowd of devices 310, e.g., based on a level of expertise of a person associated with a recommendation, based on a level of familiarity the person has with component(s) of vehicle system 102, etc. For example, cloud-based system 110 can be configured to assign a first weighting factor to a first recommendation associated with a first person who is familiar with a component of vehicle system 102, and assign a second weighting factor to a second recommendation associated with a second person who is not as familiar with the component of vehicle system 102. In another example, cloud-based system 110 can be configured to send a message, information, etc. identifying a person who provided the feedback directed to a device of vehicle system 102.

Figure 4:
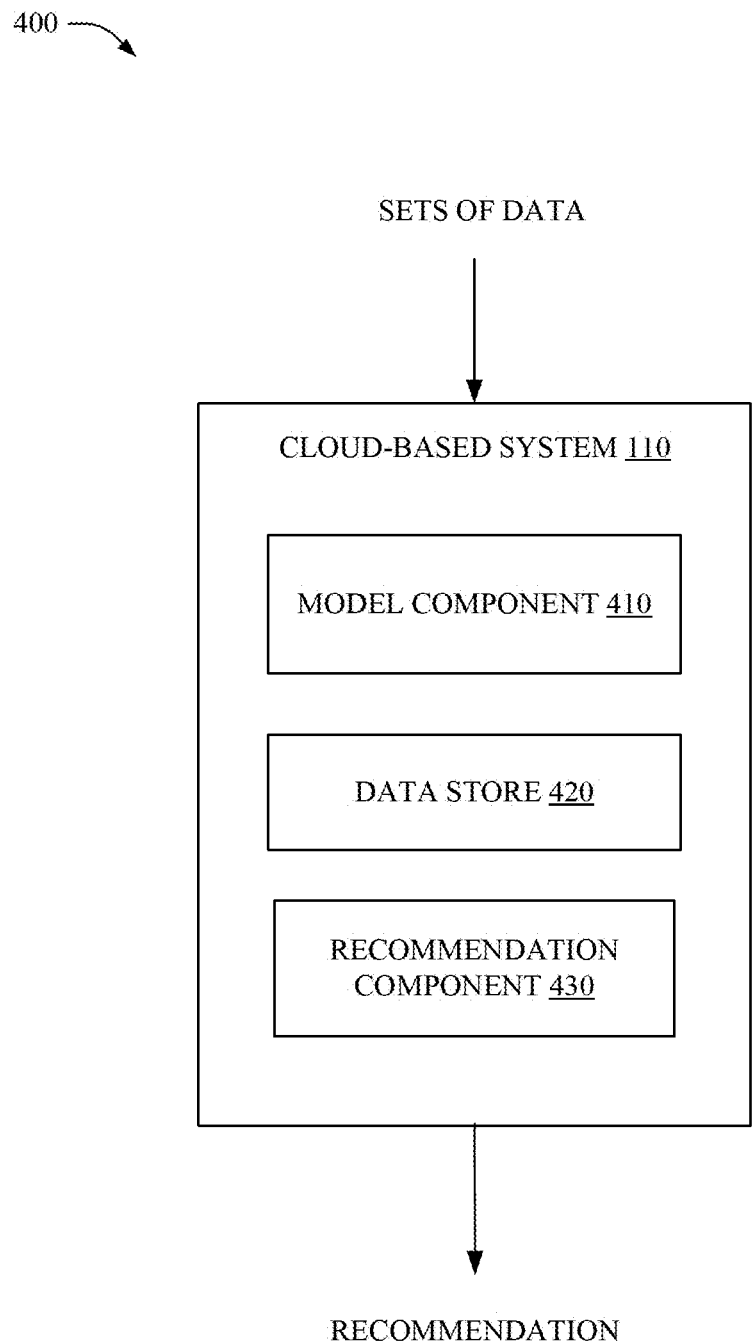
FIG. 4 illustrates a block diagram of cloud-based system, in accordance with various embodiments.
Figure 5:
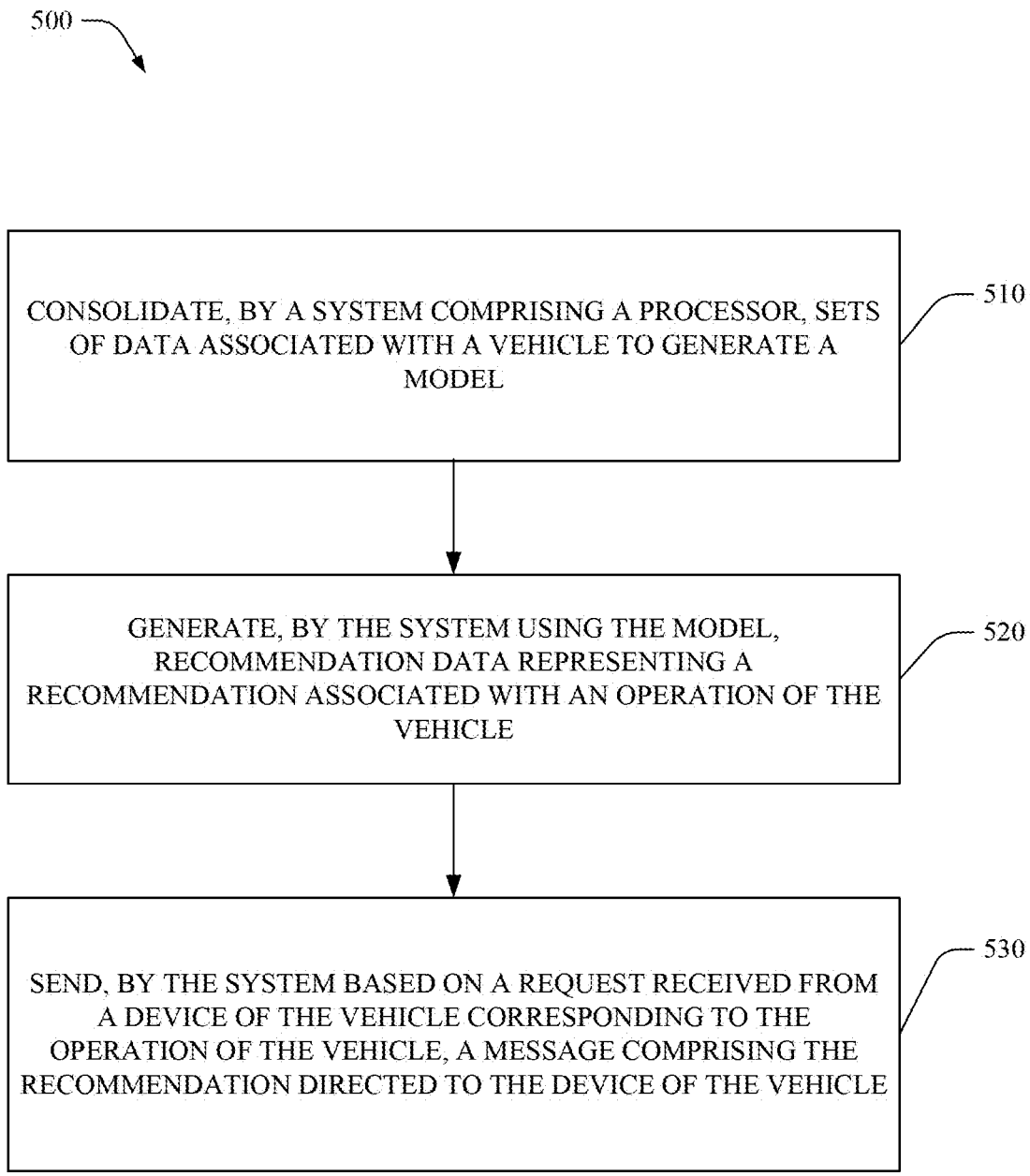
FIGS. 5-12 illustrate flowcharts of methods associated with vehicle environments, in accordance with various embodiments.

Now referring to FIG. 4, cloud-based system 110 can include model component 410 that can be configured to receive sets of data, e.g., including the sensor data, the sets of sensor data, the traffic information, the weather conditions, the driving behavior, the crowdsourced data, etc. associated with vehicle system 102. Further, model component 410 can be configured to store portion(s) of the sets of data in data store 420, and consolidate the portion(s) to generate, create, derive, etc. a model that can associate a characteristic of an element of vehicle system 102 with a recommendation associated with the operation of vehicle system 102.

In one example, model component 410 can determine, from the portion(s) of the data, that a group of vehicles of a similar make, model, and year, which have traveled during similar driving conditions, e.g., time of year, location, altitude, temperature, humidity, etc. are associated with a common characteristic with respect to the operation of vehicle system 102, e.g., drivers of the group of vehicles utilized second gear to travel over a mountain pass under similar driving conditions. In this regard, model component 410 can utilize data store 420 to associate a characteristic of an element of vehicle system 102, e.g., a selection of a gear of a transmission of vehicle system 102, with a recommendation, e.g., to utilize second gear to travel over the mountain pass under such driving conditions.

In another example, model component 410 can determine, from the portion(s) of the data, e.g., based on crowdsourced data corresponding to similar driving conditions, weather conditions, etc. that a consensus, majority, percentage, etc. of responses received from crowd of devices 310 represents a recommendation corresponding to a characteristic of an element of vehicle system 102, e.g., that the consensus of responses represents a recommendation to install studded tires before traveling over the mountain pass.

Further, cloud-based system 110 can include recommendation component 430 that can be configured to select the recommendation in response to determining, based on the sensor data and the model, whether the characteristic of the element of vehicle system 102 satisfies a defined condition with respect to the operation of vehicle system 102, e.g., whether received sensor data representing the characteristic correlates with the consensus of the responses, recommendations, etc. received from the crowd of devices regarding the characteristic, e.g., based on the weather condition information, the traffic information, etc.

In one embodiment, recommendation component 430 can be configured to send a message including the recommendation directed to a device of vehicle system 102, e.g., in response to receiving a request from the device. For example, recommendation component 430 can receive a query, e.g., including a picture, a laser scan, etc. of a tire of vehicle system 102 from a driver of vehicle system 102, and forward the query to crowd of devices 310. Further, recommendation component 430 can receive response(s), recommendation(s), etc. from crowd of devices 310 based on the query. Furthermore, recommendation component send a message including the response(s), recommendation(s), etc. from crowd of devices 310.

In another embodiment, model component 410 can be configured to determine a consensus, majority, percentage, etc. of the response(s), recommendation(s), etc. received from crowd of devices 310 based on the query, and derive a recommendation based on the consensus, majority, percentage, etc. of the response(s), recommendation(s), etc. In this regard, recommendation component 430 can be configured to send the message including such recommendation directed to the device of vehicle system 102.

In yet another embodiment, recommendation component 430 can be configured to send the message including the recommendation directed to the device of vehicle system 102 in response to automatically inferring, anticipating, etc. the request using the sensor data, the model, the crowdsourced data, the weather condition information, the traffic information, etc. For example, in response to determining, based on the sensor data, that a characteristic of a component of vehicle system 102, e.g., a tire pressure, a gas level, etc. satisfies a defined condition, e.g., the gas level is below 25% of a full tank, etc. recommendation component 430 can send a message directed to the device of vehicle system 102 including a recommendation to refuel.

In one embodiment, model component 410 can be configured to establish, define, etc., based on the sets of data, profiles corresponding to characteristic(s) of component(s) of vehicle system 102. Further, recommendation component 430 can be configured to send, based on such profiles and the sensor data, optimization information, data, messages, etc. to the device of vehicle system 102. For example, model component 410 can be configured to estimate an average gear shifting behavior, fuel economy, etc. of cars of a make, model, year, etc. similar to vehicle system 102. In this regard, model component 410 can be configured to establish a gear shifting profile of vehicle system 102 in which shifting behavior corresponding to determined gear levels can be associated with an estimated reduction in fuel economy of vehicle system 102. Further, recommendation component 430 can be configured to send, according to the gear shifting profile, a recommendation directed to the device of vehicle system 102, e.g., representing a selection of a gear that will optimized the fuel economy of vehicle system 102.

In another embodiment, recommendation component 430 can be configured to determine whether the recommendation has been received by the device of vehicle system 102, e.g., based on information, an acknowledgment message, etc. received from the device. Further, recommendation component 430 can be configured to determine whether the recommendation has been implemented, e.g., based on sensor data received from the device, based on a confirmation message received from the device, e.g., from a driver of vehicle system 102 who indicates the recommendation has been implemented, etc.

Further, in response to a determination that the recommendation has been received by the device of the vehicle, but the recommendation has not been implemented, model component 410 can update, modify, etc. future recommendation(s) accordingly, e.g., by associating non implementation of the recommendation with vehicle system 102.

In yet another embodiment, during a "safety override" configuration, recommendation component 430 can initiate a configuration, reconfiguration, etc. of element(s) of vehicle system 102 in response to automatically determining, e.g., based on the sensor data, the model, the crowdsourced data, the weather condition information, the traffic information, etc. that the characteristic satisfies the defined condition, e.g., that with 10% of a tire tread remaining, a breaking distance of vehicle system 102 in wet conditions is 40 feet instead of 20 feet. In this regard, recommendation component 430 can automatically configure acceleration, breaking, etc. components of vehicle system 102 to adjust a driving position of vehicle system 102 to be at least 40 feet from another vehicle with 10% of the tire tread remaining in wet driving conditions; and recommendation component 430 can automatically configure the acceleration, breaking, etc. components of vehicle system 102 to adjust the driving position of vehicle system 102 to be at least 20 feet from another vehicle with 10% of the tire tread remaining in dry driving conditions.

FIGS. 5-12 illustrate methodologies in accordance with the disclosed subject matter. For simplicity of explanation, the methodologies are depicted and described as a series of acts. It is to be understood and appreciated that the subject innovation is not limited by the acts illustrated and/or by the order of acts. For example, acts can occur in various orders and/or concurrently, and with other acts not presented or described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Referring now to FIGS. 5-12, processes 500 to 1200 performed by cloud-based system 110 are illustrated, in accordance with various embodiments. At 510, sets of data, e.g., sensor data, traffic data, weather data, driving behavior information, crowdsourced data, etc. associated with a characteristic of an element of a vehicle can be consolidated to generate, create, derive, etc. a model. In this regard, cloud-based system 110 can associate, using the model, the characteristic of the element, e.g., a determined percentage of remaining tire tread, etc. with a recommendation associated with an operation of the vehicle, e.g., to change the tire, to drive at a particular speed, to drive a different route, etc.

At 520, recommendation data representing the recommendation associated with an operation of the vehicle can be generated using the model. In one embodiment, the recommendation data can be generated based on sets of sensor data wirelessly received from devices of a group of vehicles, e.g., the group of vehicles associated with a similar make, model, and year of vehicle. For example, observed, recorded, etc. shifting behavior, tire wear, etc. of the group of vehicles can be used to estimate effects of such conditions on characteristics of respective components of the group of vehicles, and such information can be used to generate the recommendation data associated with the operation of the vehicle.

At 530, a message comprising the recommendation can be sent to a device of the vehicle in response to receiving a request from the device of the vehicle, e.g., the request including a query as to whether tires should be changed on the vehicle, etc.

Figure 6:
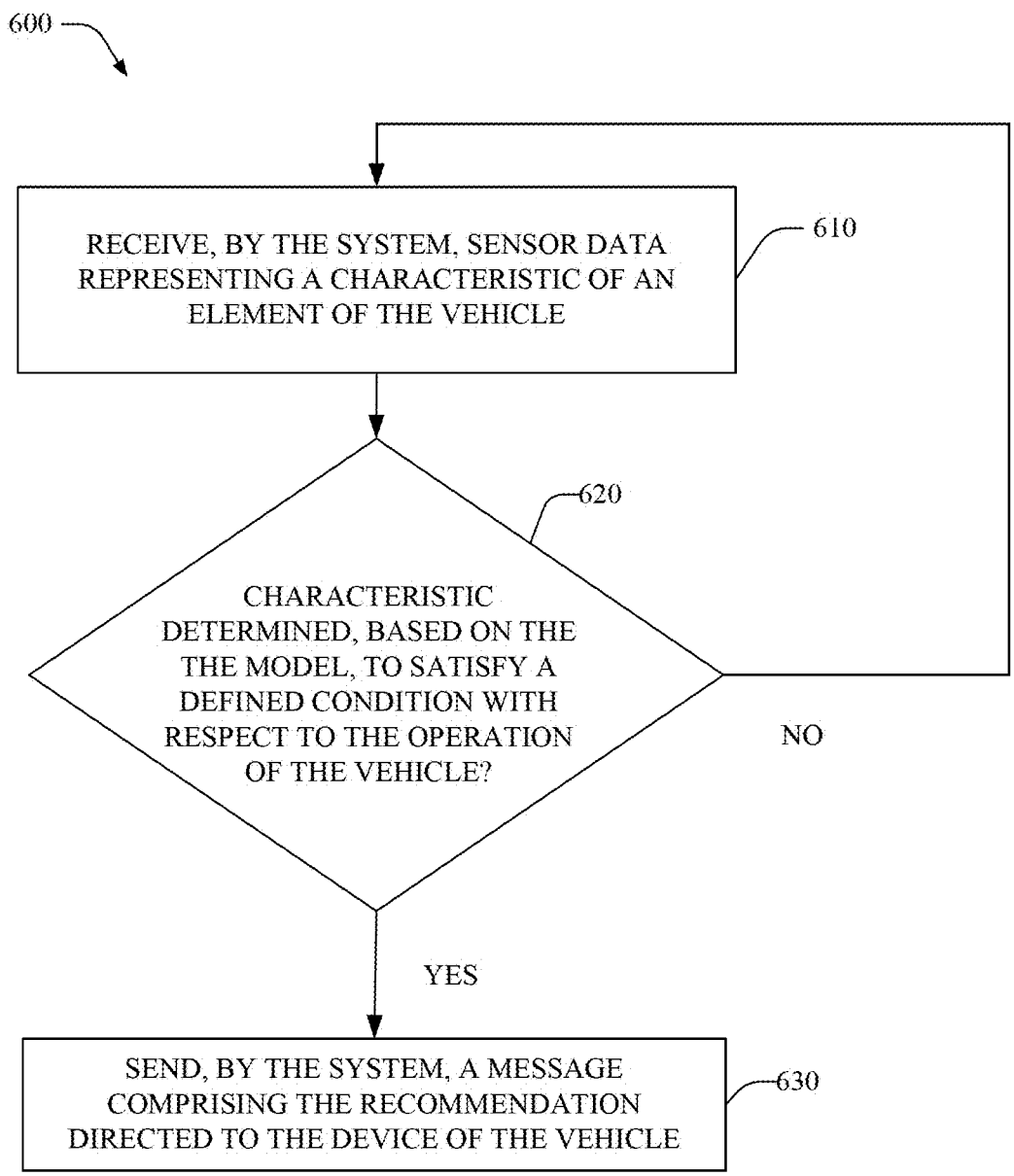

In embodiment(s) illustrated by FIG. 6, at 610, sensor data representing a characteristic of an element, e.g., remaining tire tread, fuel level, etc. of the vehicle can be received, e.g., during operation of the vehicle. At 620, in response to the characteristic being determined, based on the model, e.g., based on the information associated with the characteristics of the respective components of the group of vehicles, etc. to satisfy a defined condition with respect to the operation of the vehicle, e.g., less than 10% of the tire tread remains, the fuel level is below 10% of a complete fuel level, etc., flow continues to 630, at which a message comprising a recommendation can be sent to the device of the vehicle, e.g., to replace the tire, to refuel, etc., e.g., based on driving conditions(s), traffic condition(s), weather conditions(s), etc. related to the operation of the vehicle; otherwise, flow continues to 610. In this regard, cloud-based system 110 can automatically optimize performance of the vehicle, e.g., by anticipating, inferring, etc. requests made by the device of the vehicle.

Figure 7:
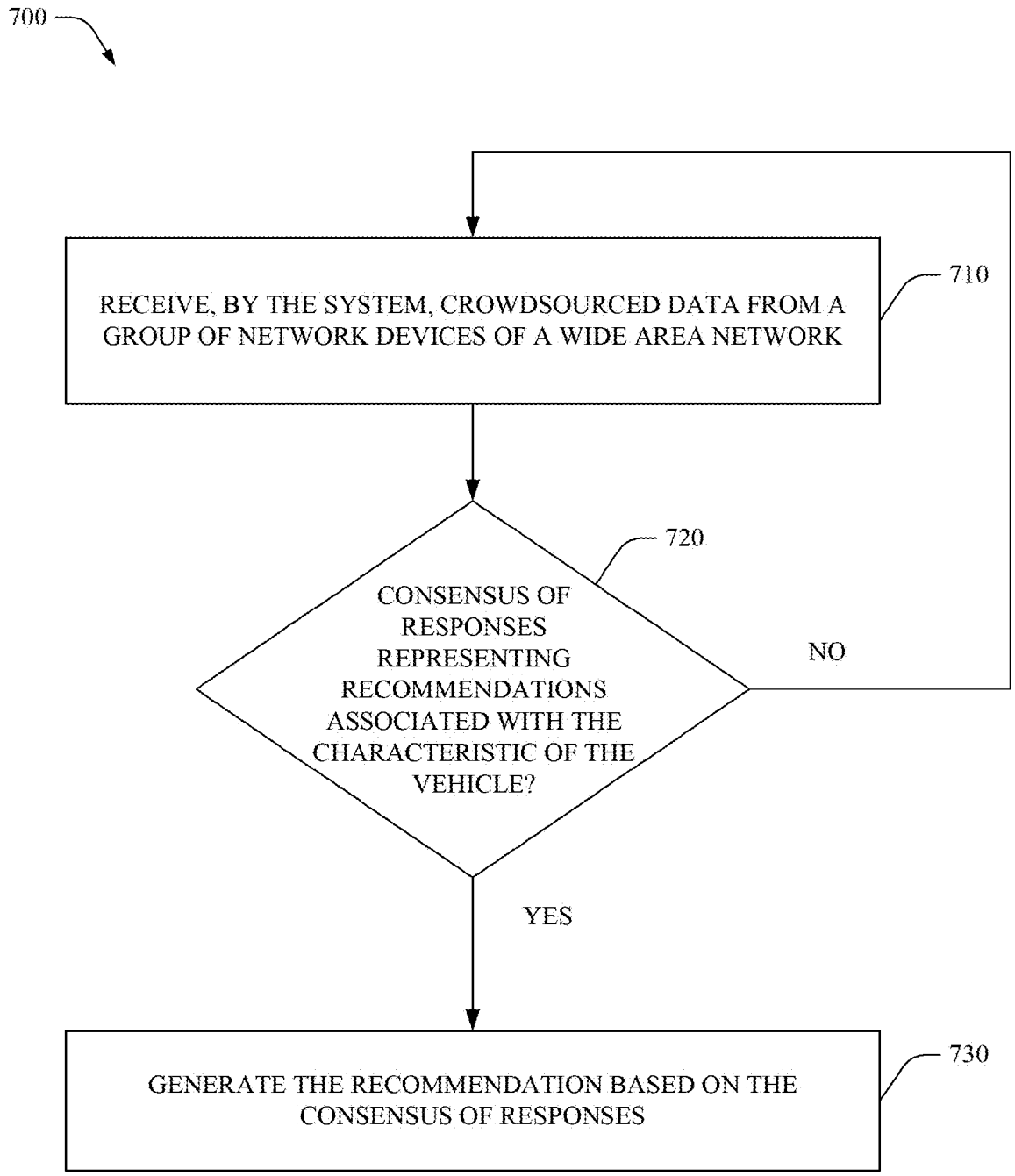

Referring to embodiment(s) illustrated by FIG. 7, at 710, crowdsourced data can be received from a group of network devices, crowd of devices, etc. of a communication network, wide area network, etc., for example, via the Internet. For example, the crowdsourced data can include human-oriented feedback from persons who have analyzed information, e.g., associated with sensor data received from the vehicle, the group of vehicles, etc., and who have provided recommendations(s) with respect to component(s) of the vehicle, e.g., based on their experiences, expertise, etc. associated with similar vehicle(s), component(s), etc.

At 720, in response to determining a consensus, an average value, etc. of responses from the group of network devices representing recommendations associated with a characteristic of a component of the vehicle, flow continues to 730, at which a recommendation can be generated based on the consensus, the average value, etc. of the responses; otherwise, flow continues to 710. For example, a recommendation to change a tire of the vehicle can be generated in response to an average value of the responses indicating that, based on a determined amount of tread remaining on the tire, the tire of the vehicle should be changed based on the traffic and weather conditions.

Figure 8:
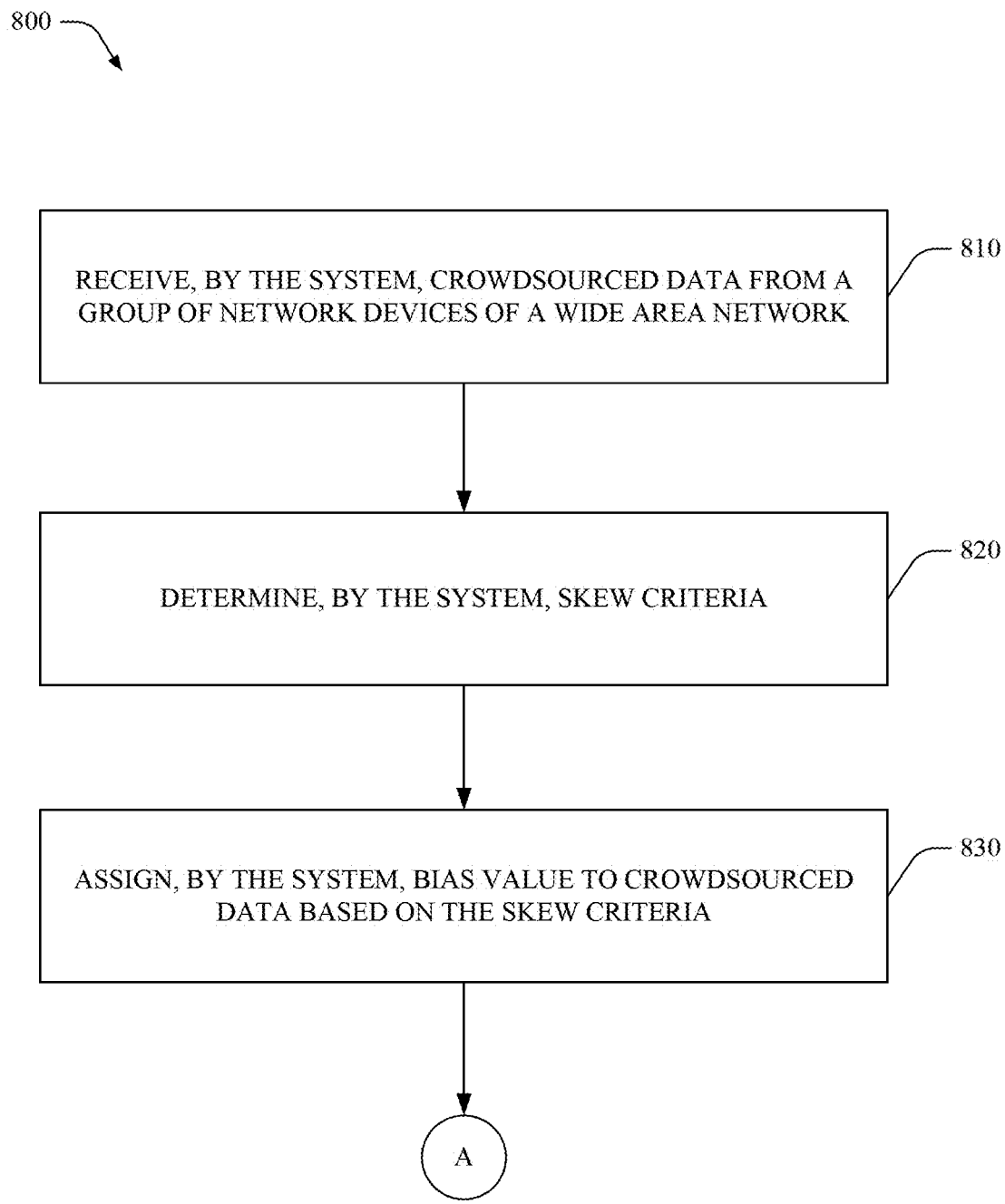
Figure 9:
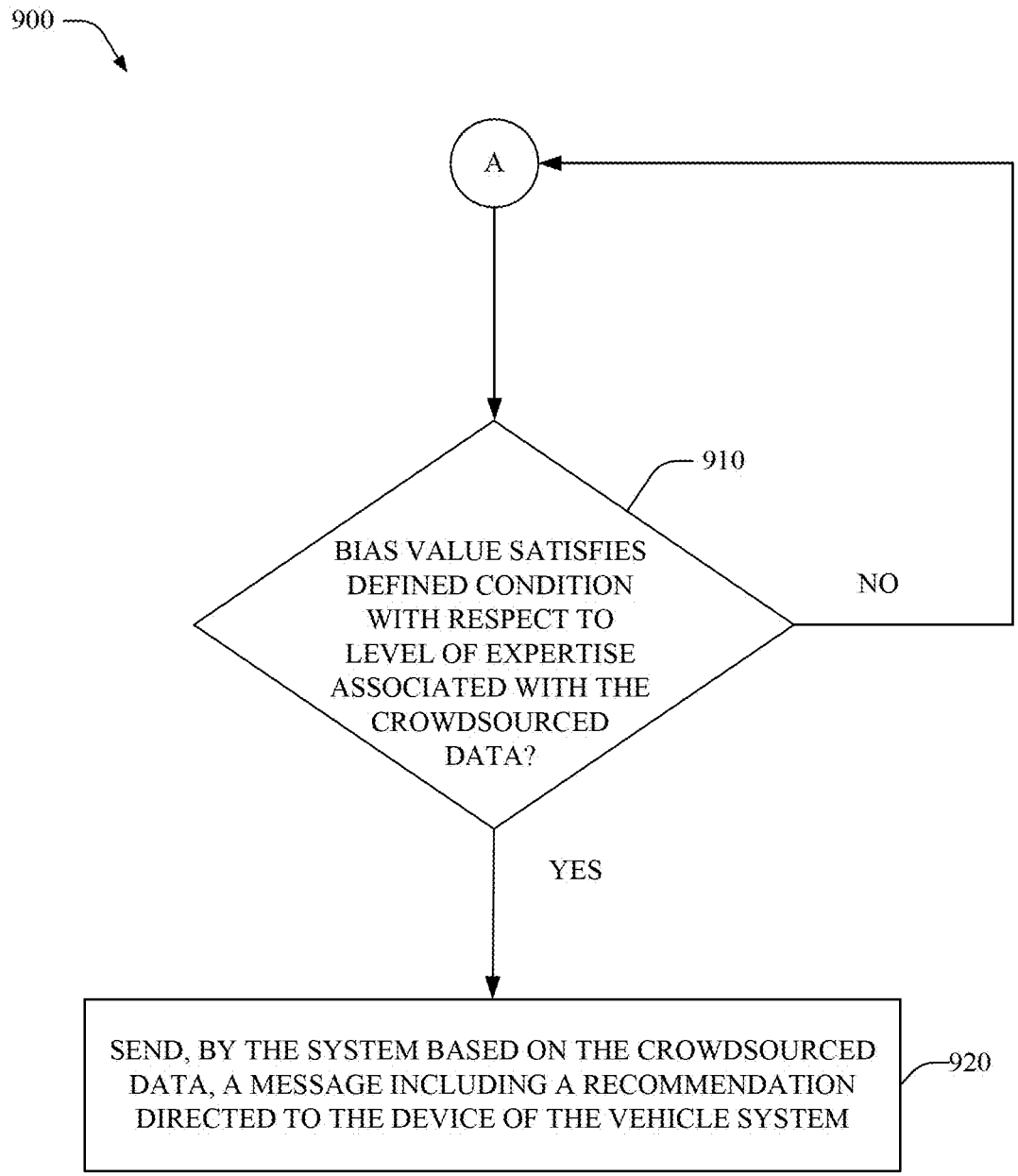

In embodiment(s) illustrated by FIGS. 8-9, crowdsourced data can be received from the group of network devices at 810. At 820, skew criteria can be determined. For example, cloud-based system 110 can be configured to skew, bias, etc. the response(s), recommendation(s), etc. received from the crowd of devices, e.g., based on a level of expertise of a person associated with a recommendation, based on a level of familiarity the person has with component(s) of vehicle, etc. At 830, a bias value can be assigned to the crowdsourced data based on the skew criteria.

At 910, it can be determined whether a bias value assigned to the crowdsourced data satisfies a defined condition with respect to a level of expertise associated with the crowdsourced data, e.g., the response(s), the recommendation(s), etc. If it is determined that the bias value satisfies the defined condition, flow continues to 920 at which a message including the recommendation can be sent to the device of the vehicle based on the crowdsourced data, otherwise flow continues to 910.

Figure 10:
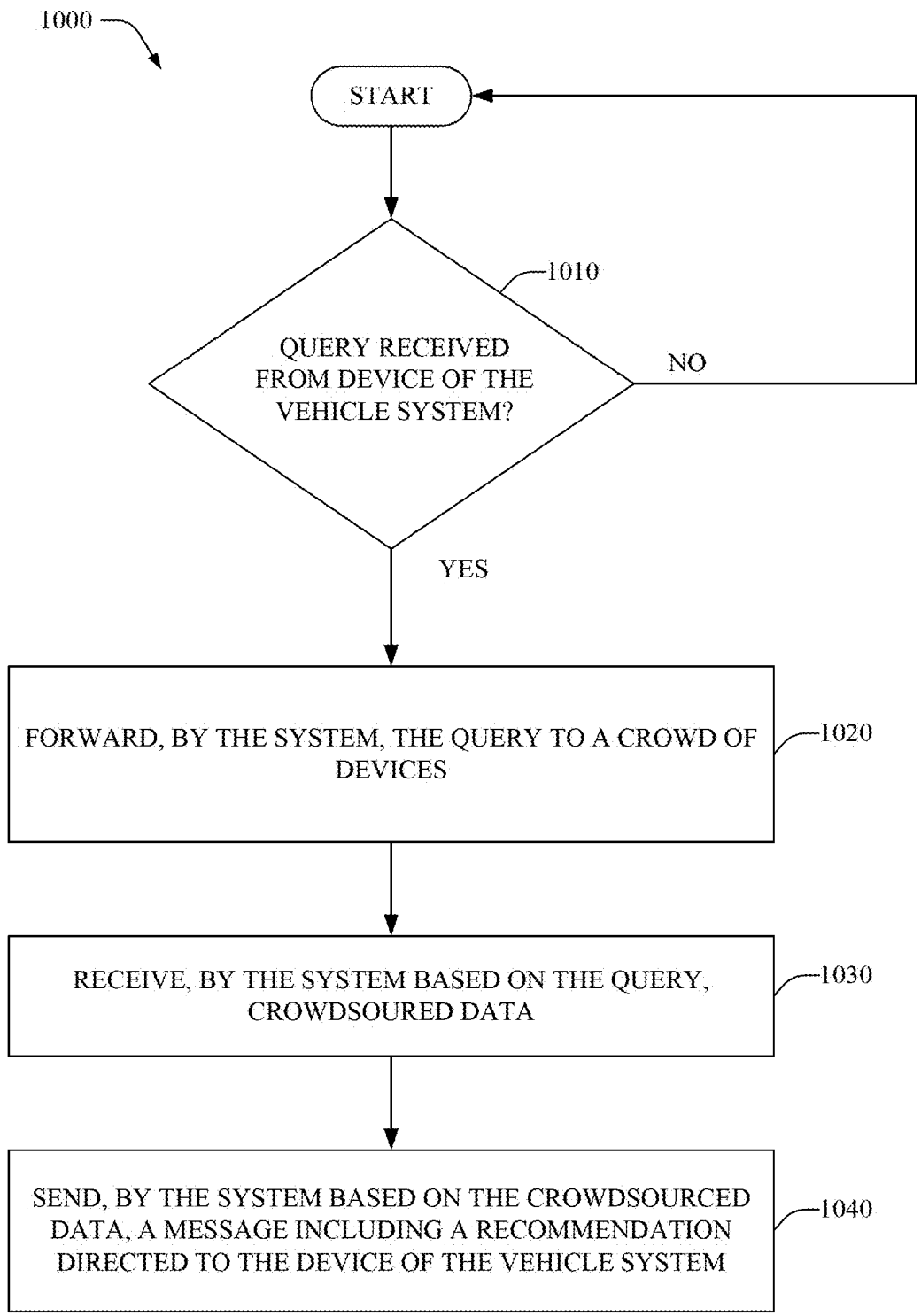

Referring now to FIG. 10, at 1010, it can be determined whether a query, solicitation, etc. for a recommendation has been received from a device of a vehicle system, e.g., inquiring whether a tire should be changed, what gear to utilize when traveling over a mountain pass, etc. If it is determined that the query, solicitation, etc. has been received, flow continues to 1020, at which the query, solicitation, etc. can be forwarded to a crowd of devices, e.g., via the Internet; otherwise, flow continues to 1010. At 1030, crowdsourced data, e.g., response(s), recommendation(s), etc. with respect to whether the tire should be changed, what transmission gear to use while traveling over the mountain pass, etc. can be received from the crowd of devices based on the query. At 1040, a message including a recommendation can be sent to the device of the vehicle based on the crowdsourced data.

In one embodiment, the crowdsourced data can include a query, solicitation, etc. from a portion of the crowd of devices requesting further information from the device of the vehicle, e.g., corresponding to characteristic(s) of component(s) of the vehicle, e.g., corresponding to the tire, the transmission of the vehicle, etc. In this regard, the crowd based feedback can be a result of multiple communications between the device of the vehicle and the crowd of devices. For example, the portion of the crowd of devices can send a request directed to the device of the vehicle to obtain further information about a characteristic of the vehicle in response to receiving information representing the query, solicitation, etc. from the device of the vehicle. Further, the portion of the crowd of devices can update, modify, etc. the recommendation based on the further information received from the device of the vehicle, and communicate a revised recommendation to the device of the vehicle.

Figure 11:
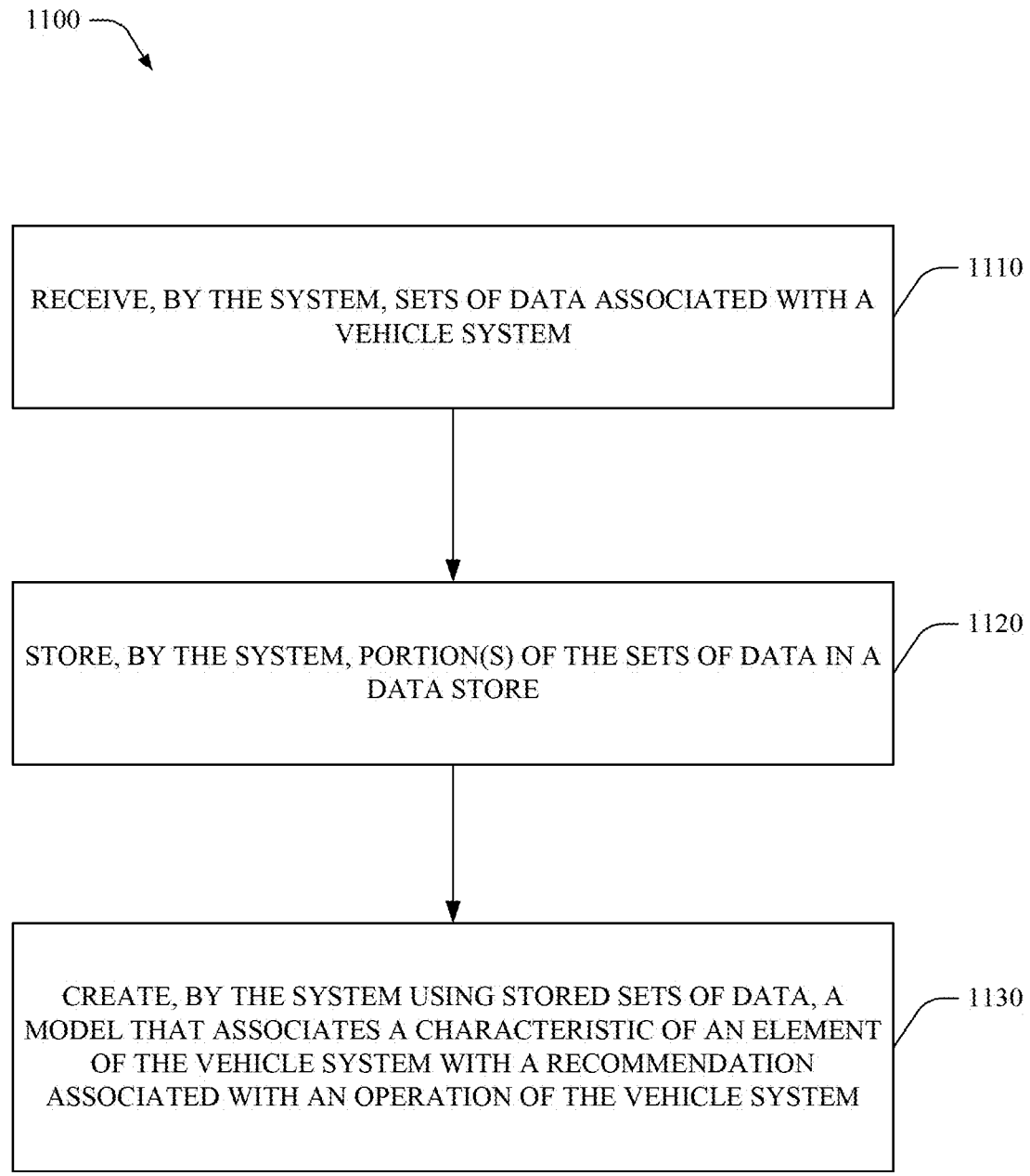

In embodiment(s) illustrated by FIG. 11, at 1110, sets of data, e.g., sensor data, traffic data, weather data, driving behavior information, crowdsourced data, etc. associated with a vehicle system can be received. At 1120, portion(s) of the sets of data can be stored in a data store. At 1130, a model associating a characteristic of an element of the vehicle system with a recommendation associated with an operation of the vehicle system can be created using the data store, e.g., a determined percentage of remaining tire tread, etc. can be associated with a recommendation to change a tire, to drive at a particular speed, etc.

Figure 12:
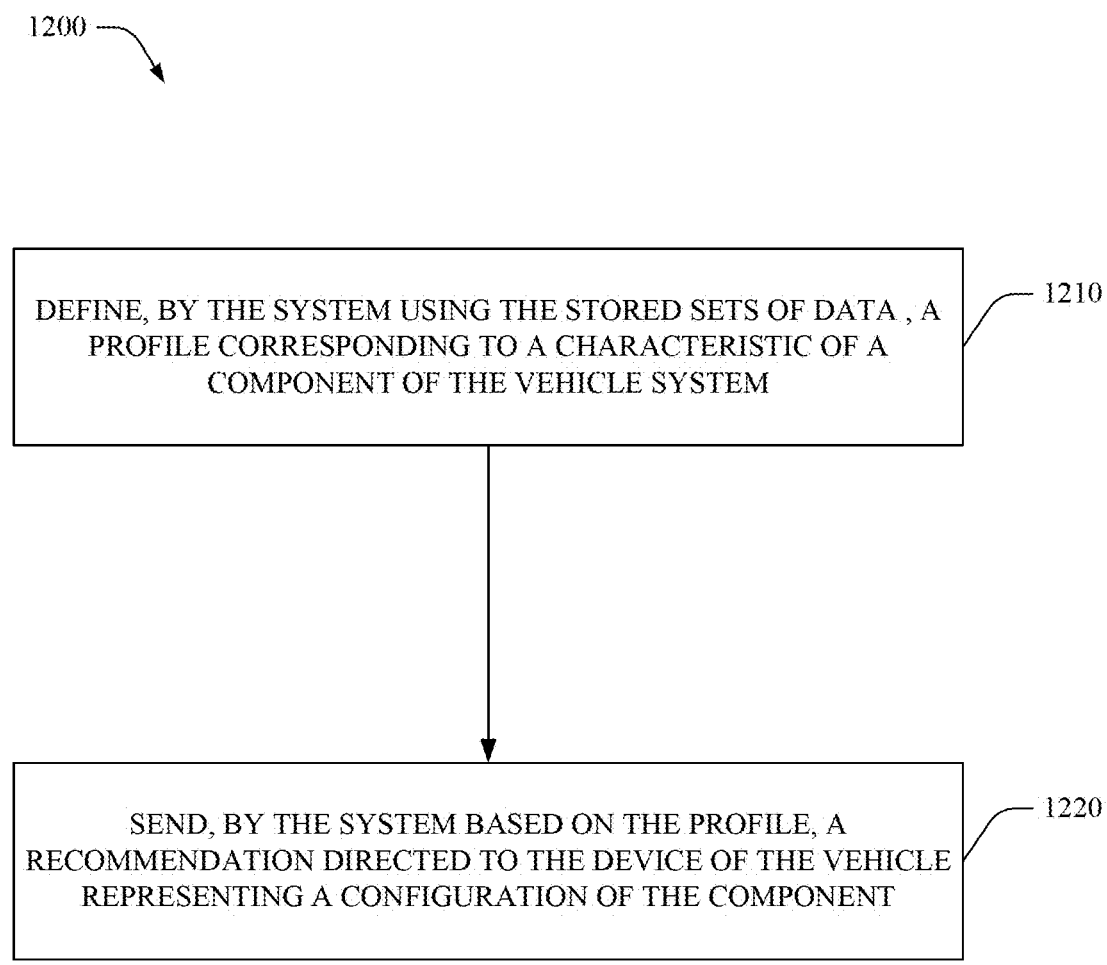

Referring now to FIG. 12, a profile corresponding to a characteristic of a component of a vehicle system can be defined, established, etc. based on portion(s) of the sets of data stored in the data store. For example, an average gear shifting behavior, fuel economy, etc. of cars of a make, model, year, etc. similar to the vehicle system can be estimated. In this regard, a gear shifting profile of the vehicle system can be established in which shifting behavior corresponding to determined gear levels can be associated with an estimated reduction in fuel economy of the vehicle system.

At 1220, a recommendation representing a configuration of the component can be sent to a device of the vehicle system based on the profile, e.g., for optimizing performance of the vehicle system, e.g., representing a selection of a gear that will optimize the fuel economy of the vehicle system.

Figure 13:
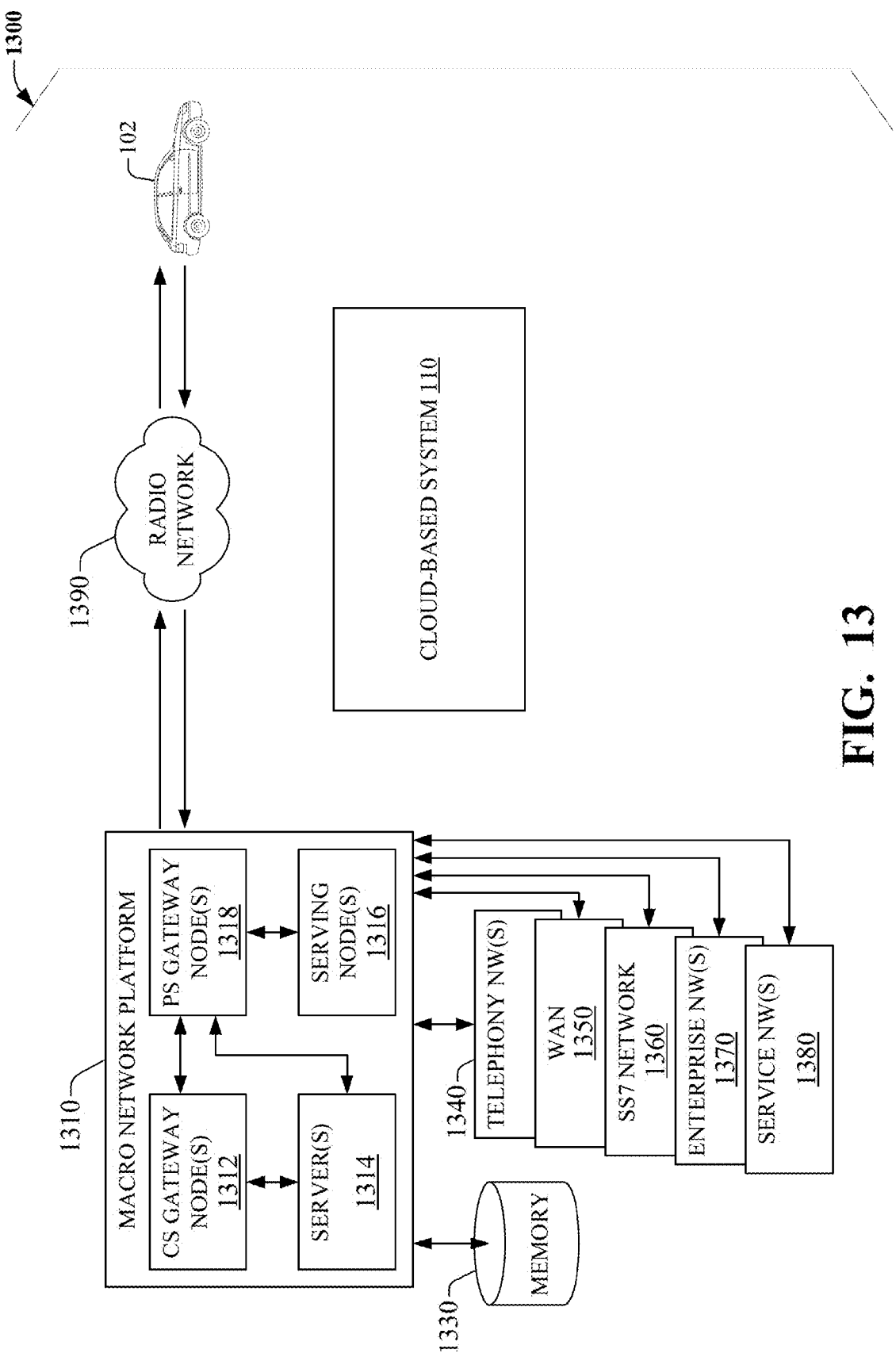
FIG. 13 illustrates a wireless communication environment, in accordance with various embodiments.

With respect to FIG. 13, a wireless communication environment 1300 including vehicle system 102, cloud-based system 110, and macro network platform 1310 is illustrated, in accordance with an embodiment. Macro network platform 1310 serves or facilitates communication with and/or between cloud-based system 110 and vehicle system 102. It should be appreciated that in cellular wireless technologies that can be associated with radio network 1390 (e.g., 3GPP UMTS, HSPA, 3GPP LTE, 3GPP2 UMB), macro network platform 1310 can be embodied in a core network, e.g., core network 104. It is noted that radio network 1390 can include base station(s), base transceiver station(s), or access point(s), and associated electronic circuitry and deployment site(s), in addition to a wireless radio link operated in accordance with the base station(s). Accordingly, radio network 1390 can comprise various coverage cells, or wireless coverage areas. In addition, it should be appreciated that elements and/or components of cloud-based system 110 can be located/included within one or more components/elements, e.g., hardware, software, etc., of wireless communication environment 1300, e.g., macro network platform 1310, radio network 1390, etc.

Generally, macro network platform 1310 includes components, e.g., nodes, gateways, interfaces, servers, or platforms that facilitate both packet-switched (PS), e.g., internet protocol (IP), frame relay, asynchronous transfer mode (ATM), and circuit-switched (CS) traffic, e.g., voice and data, and control generation for networked wireless communication, e.g., via cloud-based system 110. In an aspect of the subject innovation, macro network platform 1310 includes CS gateway node(s) 1312 which can interface CS traffic received from legacy networks like telephony network(s) 1340, e.g., public switched telephone network (PSTN), or public land mobile network (PLMN), or a SS7 network 1360. Circuit switched gateway 1312 can authorize and authenticate traffic, e.g., voice, arising from such networks. Additionally, CS gateway 1312 can access mobility or roaming data generated through SS7 network 1360; for instance, mobility data stored in a visitor location register (VLR), which can reside in memory 1330. Moreover, CS gateway node(s) 1312 interfaces CS-based traffic and signaling and gateway node(s) 1318. As an example, in a 3GPP UMTS network, PS gateway node(s) 1318 can be embodied in gateway GPRS support node(s) (GGSN).

In addition to receiving and processing CS-switched traffic and signaling, PS gateway node(s) 1318 can authorize and authenticate PS-based data sessions with served, e.g., through macro RAN, wireless devices. Data sessions can include traffic exchange with networks external to the macro network platform 1310, like wide area network(s) (WANs) 1350; enterprise networks (NWs) 1370, e.g., enhanced 911, or service NW(s) 1380 like IP multimedia subsystem (IMS). It should be appreciated that local area network(s) (LANs), which may be a part of enterprise NW(s), can also be interfaced with macro network platform 1310 through PS gateway node(s) 1318. Packet-switched gateway node(s) 1318 generates packet data contexts when a data session is established. To that end, in an aspect, PS gateway node(s) 1318 can include a tunnel interface, e.g., tunnel termination gateway (TTG) in 3GPP UMTS network(s) (not shown), which can facilitate packetized communication with disparate wireless network(s), such as Wi-Fi networks. It should be further appreciated that the packetized communication can include multiple flows that can be generated through server(s) 1314. It is to be noted that in 3GPP UMTS network(s), PS gateway node(s) 1318 (e.g., GGSN) and tunnel interface (e.g., TTG) comprise a packet data gateway (PDG).

Macro network platform 1310 also includes serving node(s) 1316 that can convey the various packetized flows of information, or data streams, received through PS gateway node(s) 1318. As an example, in a 3GPP UMTS network, serving node(s) can be embodied in serving GPRS support node(s) (SGSN).

As indicated above, server(s) 1314 in macro network platform 1310 can execute numerous applications, e.g., messaging, location services, wireless device management, etc. that can generate multiple disparate packetized data streams or flows; and can manage such flows, e.g., schedule, queue, format. Such application(s), for example can include add-on features to standard services provided by macro network platform 1310. Data streams can be conveyed to PS gateway node(s) 1318 for authorization/authentication and initiation of a data session, and to serving node(s) 1316 for communication thereafter. Server(s) 1314 can also effect security, e.g., implement one or more firewalls, of macro network platform 1310 to ensure network's operation and data integrity in addition to authorization and authentication procedures that CS gateway node(s) 1312 and PS gateway node(s) 1318 can enact. Moreover, server(s) 1314 can provision services from external network(s), e.g., WAN 1350, or Global Positioning System (GPS) network(s), which can be a part of enterprise NW(s) 1380. It is to be noted that server(s) 1314 can include one or more processors configured to confer at least in part the functionality of macro network platform 1310. To that end, the one or more processors can execute code instructions stored in memory 1330, for example.

In example wireless communication environment 1300, memory 1330 stores information related to operation of macro network platform 1310 and cloud-based system 110. The information can include business data associated with subscribers; market plans and strategies, e.g., promotional campaigns, business partnerships; operational data for vehicle systems, mobile devices served through macro network platform, etc.; service and privacy policies; end-user service logs for law enforcement; term(s) and/or condition(s) associated with wireless service(s) provided via radio network 1390; and so forth. Memory 1330 can also store information from at least one of telephony network(s) 1340, WAN 1350, SS7 network 1360, enterprise NW(s) 1370, or service NW(s) 1380.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor may also be implemented as a combination of computing processing units.

In the subject specification, terms such as "store," "data store," data storage," "database," and substantially any other information storage component relevant to operation and functionality of a component and/or process, refer to "memory components," or entities embodied in a "memory," or components comprising the memory. It will be appreciated that the memory components described herein can be either volatile memory or nonvolatile memory, or can include both volatile and nonvolatile memory.

By way of illustration, and not limitation, nonvolatile memory, for example, can be included in non-volatile memory 1422 (see below), disk storage 1424 (see below), and/or memory storage 1446 (see below). Further, nonvolatile memory can be included in read only memory (ROM), programmable ROM (PROM), electrically programmable ROM (EPROM), electrically erasable ROM (EEPROM), or flash memory. Volatile memory 1420 can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Figure 14:
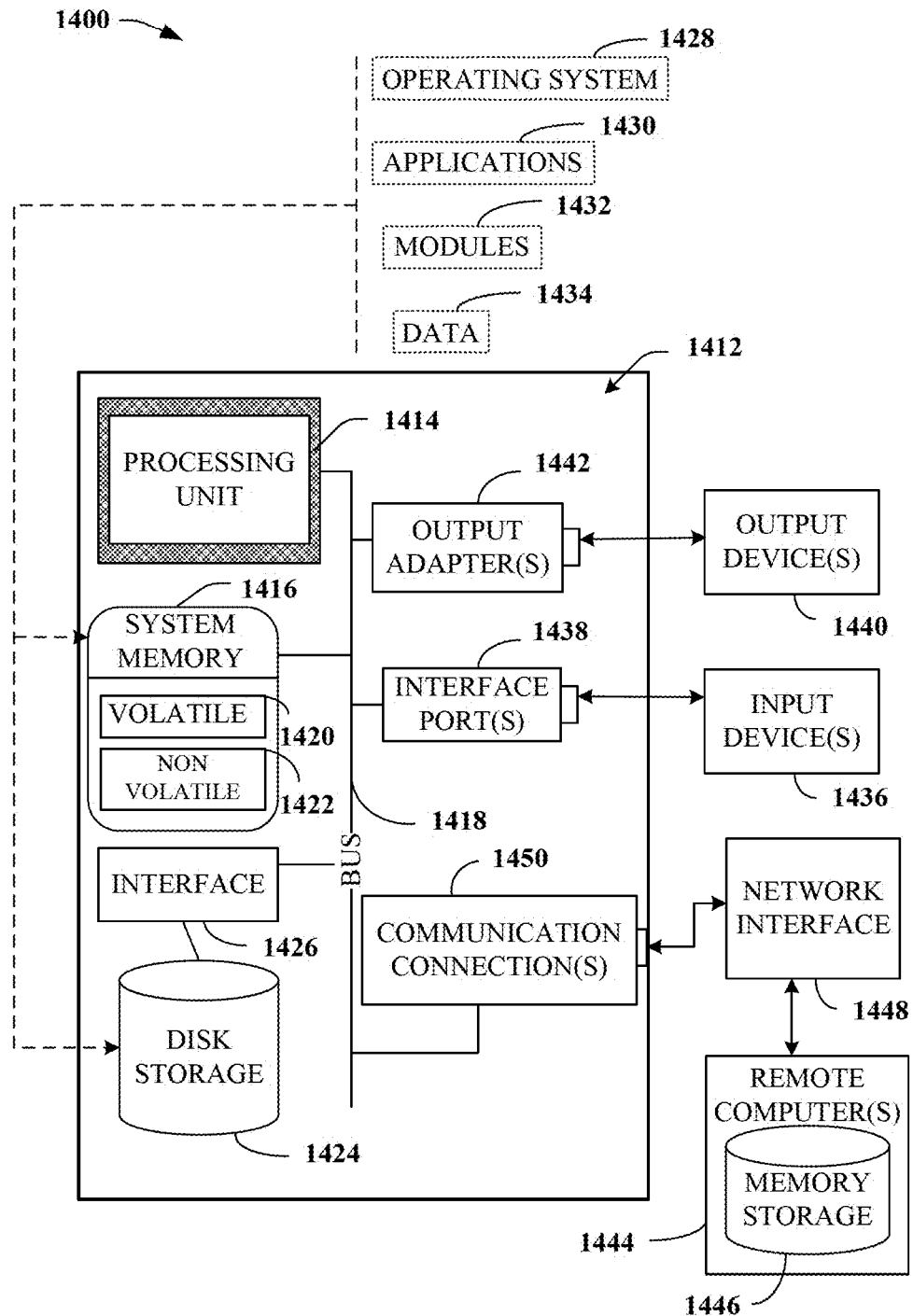
FIG. 14 illustrates a block diagram of a computing system operable to execute the disclosed systems, methods and apparatus, in accordance with various embodiments.

In order to provide a context for the various aspects of the disclosed subject matter, FIG. 14, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the subject innovation also can be implemented in combination with other program modules. Generally, program modules include routines, programs, components, data structures, etc. that perform particular tasks and/or implement particular abstract data types.

Moreover, those skilled in the art will appreciate that the inventive systems can be practiced with other computer system configurations, including single-processor or multi-processor computer systems, mini-computing devices, mainframe computers, as well as personal computers, hand-held computing devices (e.g., PDA, phone, watch), micro-processor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

With reference to FIG. 14, a block diagram of a computing system 1400 operable to execute the disclosed systems and methods is illustrated, in accordance with an embodiment. Computer 1412 includes a processing unit 1414, a system memory 1416, and a system bus 1418. System bus 1418 couples system components including, but not limited to, system memory 1416 to processing unit 1414. Processing unit 1414 can be any of various available processors. Dual microprocessors and other multiprocessor architectures also can be employed as processing unit 1414.

System bus 1418 can be any of several types of bus structure(s) including a memory bus or a memory controller, a peripheral bus or an external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), Small Computer Systems Interface (SCSI), and/or controller area network (CAN) bus used in vehicles.

System memory 1416 includes volatile memory 1420 and nonvolatile memory 1422. A basic input/output system (BIOS), containing routines to transfer information between elements within computer 1412, such as during start-up, can be stored in nonvolatile memory 1422. By way of illustration, and not limitation, nonvolatile memory 1422 can include ROM, PROM, EPROM, EEPROM, or flash memory. Volatile memory 1420 includes RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1412 also includes removable/non-removable, volatile/non-volatile computer storage media. FIG. 14 illustrates, for example, disk storage 1424. Disk storage 1424 includes, but is not limited to, devices like a magnetic disk drive, floppy disk drive, tape drive, Jaz drive, Zip drive, LS-100 drive, flash memory card, or memory stick. In addition, disk storage 1424 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1424 to system bus 1418, a removable or non-removable interface is typically used, such as interface 1426.

It is to be appreciated that FIG. 14 describes software that acts as an intermediary between users and computer resources described in suitable operating environment 1400. Such software includes an operating system 1428. Operating system 1428, which can be stored on disk storage 1424, acts to control and allocate resources of computer system 1412. System applications 1430 take advantage of the management of resources by operating system 1428 through program modules 1432 and program data 1434 stored either in system memory 1416 or on disk storage 1424. It is to be appreciated that the disclosed subject matter can be implemented with various operating systems or combinations of operating systems.

A user can enter commands or information into computer 1412 through input device(s) 1436. Input devices 1436 include, but are not limited to, a pointing device such as a mouse, trackball, stylus, touch pad, keyboard, microphone, joystick, game pad, satellite dish, scanner, TV tuner card, digital camera, digital video camera, web camera, cellular phone, user equipment, smartphone, and the like. These and other input devices connect to processing unit 1414 through system bus 1418 via interface port(s) 1438. Interface port(s) 1438 include, for example, a serial port, a parallel port, a game port, a universal serial bus (USB), a wireless based port, e.g., WiFi, Bluetooth®, etc. Output device(s) 1440 use some of the same type of ports as input device(s) 1436.

Thus, for example, a USB port can be used to provide input to computer 1412 and to output information from computer 1412 to an output device 1440. Output adapter 1442 is provided to illustrate that there are some output devices 1440, like display devices, light projection devices, monitors, speakers, and printers, among other output devices 1440, which use special adapters. Output adapters 1442 include, by way of illustration and not limitation, video and sound devices, cards, etc. that provide means of connection between output device 1440 and system bus 1418. It should be noted that other devices and/or systems of devices provide both input and output capabilities such as remote computer(s) 1444.

Computer 1412 can operate in a networked environment using logical connections to one or more remote computers, such as remote computer(s) 1444. Remote computer(s) 1444 can be a personal computer, a server, a router, a network PC, a workstation, a microprocessor based appliance, a peer device, or other common network node and the like, and typically includes many or all of the elements described relative to computer 1412.

For purposes of brevity, only a memory storage device 1446 is illustrated with remote computer(s) 1444. Remote computer(s) 1444 is logically connected to computer 1412 through a network interface 1448 and then physically and/or wirelessly connected via communication connection 1450. Network interface 1448 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1450 refer(s) to hardware/software employed to connect network interface 1448 to bus 1418. While communication connection 1450 is shown for illustrative clarity inside computer 1412, it can also be external to computer 1412. The hardware/software for connection to network interface 1448 can include, for example, internal and external technologies such as modems, including regular telephone grade modems, cable modems and DSL modems, wireless modems, ISDN adapters, and Ethernet cards.

The computer 1412 can operate in a networked environment using logical connections via wired and/or wireless communications to one or more remote computers, cellular based devices, user equipment, smartphones, or other computing devices, such as workstations, server computers, routers, personal computers, portable computers, microprocessor-based entertainment appliances, peer devices or other common network nodes, etc. The computer 1412 can connect to other devices/networks by way of antenna, port, network interface adaptor, wireless access point, modem, and/or the like.

The computer 1412 is operable to communicate with any wireless devices or entities operatively disposed in wireless communication, e.g., a printer, scanner, desktop and/or portable computer, portable data assistant, communications satellite, user equipment, cellular base device, smartphone, any piece of equipment or location associated with a wirelessly detectable tag (e.g., scanner, a kiosk, news stand, restroom), and telephone. This includes at least WiFi and Bluetooth® wireless technologies. Thus, the communication can be a predefined structure as with a conventional network or simply an ad hoc communication between at least two devices.

WiFi allows connection to the Internet from a desired location (e.g., a vehicle, couch at home, a bed in a hotel room, or a conference room at work, etc.) without wires. WiFi is a wireless technology similar to that used in a cell phone that enables such devices, e.g., mobile phones, computers, etc., to send and receive data indoors and out, anywhere within the range of a base station. WiFi networks use radio technologies called IEEE 802.11 (a, b, g, etc.) to provide secure, reliable, fast wireless connectivity. A WiFi network can be used to connect communication devices (e.g., mobile phones, computers, etc.) to each other, to the Internet, and to wired networks (which use IEEE 802.3 or Ethernet). WiFi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
in response to evaluating crowdsourced data for a vehicle representative of feedback that has been obtained via network devices, generating, by a system comprising a processor, recommendation data representative of a collaborative recommendation for the vehicle; and
after sending a message comprising the collaborative recommendation directed to a device of the vehicle, determining, by the system, whether the message has been received by the device of the vehicle.

2. The method of claim 1, further comprising:
in response to determining that the message has been received by the device of the vehicle, determining, by the system, whether the collaborative recommendation has been implemented.

3. The method of claim 2, wherein the determining whether the collaborative recommendation has been implemented comprises determining, based on sensor data that has been received from the device, whether the collaborative recommendation has been implemented.

4. The method of claim 2, wherein the determining whether the collaborative recommendation has been implemented comprises determining, based on a confirmation message representative of an input of an occupant of the vehicle, whether the collaborative recommendation has been implemented.

5. The method of claim 2, further comprising:
in response to determining that the collaborative recommendation has not been implemented, modifying, by the system, future recommendations.

6. The method of claim 1, wherein the sending of the message comprises:
predicting, using the crowdsourced data, that the device of the vehicle will send a request corresponding to an operation of the vehicle; and
in response to the predicting, sending the message directed to the device of the vehicle.

7. The method of claim 1, wherein the evaluating the crowdsourced data comprises:
consolidating the crowdsourced data into a data structure representing a model that associates a characteristic of an element of the vehicle with the collaborative recommendation.

8. The method of claim 7, wherein the consolidating comprises:
receiving, from devices of vehicles comprising the vehicle, respective sensor data associated with the characteristic; and
generating the data structure using the respective sensor data.

9. The method of claim 7, wherein the consolidating comprises:
receiving information representing a driving condition with respect to an operation of the vehicle; and
generating the data structure using the information representing the driving condition.

10. The method of claim 1, wherein the evaluating the crowdsourced data comprises:
receiving network based communications representing a characteristic of the vehicle from a group of the network devices via an Internet based interface; and
generating a data structure representing a model that associates the characteristic with the collaborative recommendation.

11. A system, comprising:
a processor, and
a memory that stores executable instructions that, when executed by the processor, facilitate performance of operations, comprising:
based on data that has been obtained via network based communications representing a characteristic of a vehicle, generating a collective recommendation for the vehicle; and
in response to sending the collective recommendation directed to a device of the vehicle, determining whether the collective recommendation has been received by the device of the vehicle.

12. The system of claim 11, wherein the operations further comprise:
in response to determining that the collective recommendation has been received by the device of the vehicle, determining whether the collective recommendation has been implemented.

13. The system of claim 11, wherein the generating the collective recommendation comprises:
generating, based on the data, a model associating the characteristic of the vehicle with the collective recommendation.

14. The system of claim 11, wherein the operations further comprise:
receiving the data from respective devices via an interface to a wide area network.

15. The system of claim 11, wherein the generating the collective recommendation comprises:
receiving, from the device of the vehicle, sensor data representing the characteristic; and
determining, based on the sensor data, whether the characteristic satisfies a defined condition with respect to the vehicle.

16. The system of claim 15, wherein the determining whether the characteristic satisfies the defined condition comprises:
in response to determining, based on the sensor data, that the characteristic satisfies the defined condition with respect to the vehicle, performing the generating the collective recommendation.

17. A machine-readable storage medium, comprising executable instructions that, when executed by a processor, facilitate performance of operations, comprising:

based on data representing a characteristic of a vehicle that has been solicited from contributor devices via an Internet based interface, creating a recommendation with respect to the vehicle; and in response to sending the recommendation directed to a device of the vehicle, receiving feedback data representing whether the recommendation has been received.

18. The machine-readable storage medium of claim 17, wherein the creating the recommendation comprises:

in response to determining, based on the data, that the characteristic satisfies a defined condition with respect to an operation of the vehicle, performing the creating the recommendation.

19. The machine-readable storage medium of claim 18, wherein the data comprises sensor data, and wherein the creating the recommendation comprises:

receiving, from the device of the vehicle, the sensor data; and in response to determining, based on the sensor data, that the characteristic satisfies a defined condition with respect to an operation of the vehicle, performing the creating the recommendation.

20. The computer-readable storage device of claim 17, wherein the operations further comprise:

in response to determining that the recommendation has been received, determining whether the recommendation has been implemented.

\* \* \* \* \*